US011238475B2

(12) United States Patent
Takei et al.

(10) Patent No.: US 11,238,475 B2
(45) Date of Patent: Feb. 1, 2022

(54) SYSTEM FOR GIVING ENTERTAINMENT ELEMENT IN RETURN FOR WATCHING ADVERTISEMENT

(71) Applicant: BANDAI NAMCO Entertainment Inc., Tokyo (JP)

(72) Inventors: Yuka Takei, Tokyo (JP); Akio Onda, Warabi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 422 days.

(21) Appl. No.: 15/855,185

(22) Filed: Dec. 27, 2017

(65) Prior Publication Data

US 2018/0181977 A1 Jun. 28, 2018

(30) Foreign Application Priority Data

Dec. 28, 2016 (JP) .............................. JP2016-256826

(51) Int. Cl.
  *G06Q 30/00* (2012.01)
  *G06Q 30/02* (2012.01)
  *A63F 13/61* (2014.01)

(52) U.S. Cl.
  CPC ......... *G06Q 30/0209* (2013.01); *A63F 13/61* (2014.09); *G06Q 30/0251* (2013.01)

(58) Field of Classification Search
  None
  See application file for complete search history.

(56) References Cited

U.S. PATENT DOCUMENTS

| 6,594,640 | B1* | 7/2003 | Postrel | G06Q 20/06 |
| | | | | 705/14.27 |
| 7,698,178 | B2* | 4/2010 | Chu | G06Q 30/0242 |
| | | | | 705/28 |
| 2007/0078706 | A1* | 4/2007 | Datta | A63F 13/79 |
| | | | | 705/14.5 |
| 2009/0054158 | A1 | 2/2009 | Kaneko et al. | |

(Continued)

FOREIGN PATENT DOCUMENTS

| JP | 2001-149654 A | 6/2001 |
| JP | 2003-529093 A | 9/2003 |

(Continued)

OTHER PUBLICATIONS

Unknown; Reward users for watching videos with rewarded video ads; Mar. 14, 2016: GoogleAdMob Help "https://support.google.com/admob/answer/6373180?hl=en" (Year: 2016).*

Primary Examiner — Sam Refai
Assistant Examiner — Rashida R Shorter
(74) Attorney, Agent, or Firm — Posz Law Group, PLC

(57) ABSTRACT

When control is performed to output a watching target advertisement on a display screen displaying a game image, a user selects and sets an input element from entertainment elements, related to the game, possessed by the user. When the input element is determined, the watching target advertisement is controlled. The input element is consumed when the watching control is completed. Then, an output element, which is an entertainment element different from the input element and is selected based on information on the watching target advertisement, information on the input element, and the like, is given to the user.

22 Claims, 32 Drawing Sheets

(56) References Cited

U.S. PATENT DOCUMENTS

| | | | |
|---|---|---|---|
| 2010/0174593 A1 | 7/2010 | Cao et al. | |
| 2014/0067516 A1* | 3/2014 | Price | G06Q 30/0246 |
| | | | 705/14.39 |
| 2014/0357345 A1* | 12/2014 | Santini | A63F 13/61 |
| | | | 463/25 |
| 2014/0358260 A1* | 12/2014 | Burgin | G06Q 30/0277 |
| | | | 700/91 |
| 2016/0067593 A1* | 3/2016 | Yim | G06T 19/006 |
| | | | 463/31 |
| 2017/0116820 A1* | 4/2017 | Berman | G07F 17/3225 |
| 2018/0181977 A1 | 6/2018 | Takei et al. | |

FOREIGN PATENT DOCUMENTS

| | | |
|---|---|---|
| JP | 2006-271904 A | 10/2006 |
| JP | 2012-511187 A | 5/2012 |
| JP | 6437995 B2 | 12/2018 |
| WO | 01/39067 A1 | 5/2001 |

\* cited by examiner

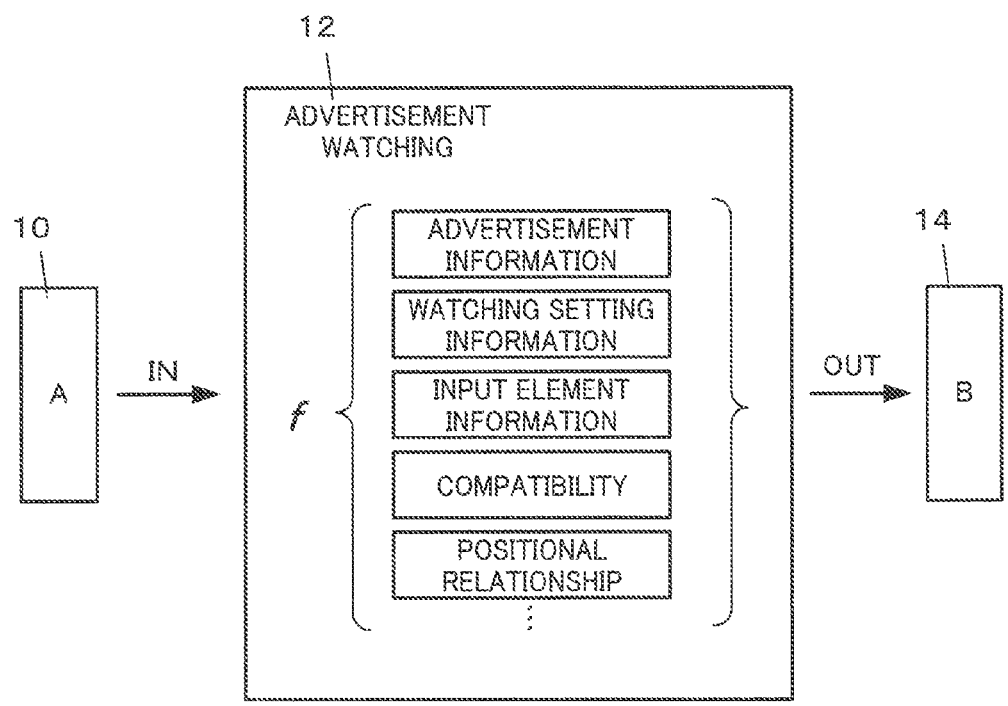

FIRST SUB CONVERSION RATE SETTING DATA

| SELECTION CONDITION (581) | FIRST SUB CONVERSION RATE (583a) | ... |
|---|---|---|
| SPECIFIC ADVERTISEMENT ID LIST (NO. 1) | 2.0 | ... |
| SPECIFIC ADVERTISEMENT ID LIST (NO. 2) | 1.2 | ... |
| ⋮ | ⋮ | ⋮ |

SECOND SUB CONVERSION RATE SETTING DATA

| SELECTION CONDITION (581) | SECOND SUB CONVERSION RATE (583b) | ... |
|---|---|---|
| SPECIFIC SPONSOR ID (NO. 1) | 1.0 | ... |
| SPECIFIC SPONSOR ID (NO. 2) | 0.8 | ... |
| ⋮ | ⋮ | ⋮ |

THIRD SUB CONVERSION RATE SETTING DATA

| SELECTION CONDITION | THIRD SUB CONVERSION RATE | ... |
|---|---|---|
| ADVERTISEMENT CATEGORY (NO. 1) | 1.1 | ... |
| ADVERTISEMENT CATEGORY (NO. 2) | 0.7 | ... |
| ⋮ | ⋮ | ⋮ |

FOURTH SUB CONVERSION RATE SETTING DATA

| SELECTION CONDITION | FOURTH SUB CONVERSION RATE | ... |
|---|---|---|
| MOVIE・90SECONDS・DISPLAY SIZE LARGE | 1.2 | ... |
| MOVIE・90SECONDS・DISPLAY SIZE MEDIUM | 1.1 | ... |
| MOVIE・60SECONDS・DISPLAY SIZE LARGE | 1.15 | ... |
| ⋮ | ⋮ | ⋮ |
| STILL IMAGE・90SECONDS・DISPLAY SIZE LARGE | 1.1 | ... |
| STILL IMAGE・90SECONDS | 1.0 | ... |
| ⋮ | ⋮ | ⋮ |
| AUDIO ONLY | 0.6 | ... |
| ⋮ | ⋮ | ⋮ |

FIFTH SUB CONVERSION RATE SETTING DATA

| SELECTION CONDITION (581) | FIFTH SUB CONVERSION RATE (583e) | ... |
|---|---|---|
| ATTRIBUTE COMPATIBILITY = GOOD | 1.1 | ... |
| ATTRIBUTE COMPATIBILITY = NORMAL | 1.0 | ... |
| ATTRIBUTE COMPATIBILITY = BAD | 0.6 | ... |
| ⋮ | ⋮ | ⋮ |

SIXTH SUB CONVERSION RATE SETTING DATA

| SELECTION CONDITION (581) | SIXTH SUB CONVERSION RATE (583f) | ... |
|---|---|---|
| ITEM POSSESSED QUANTITY = 1 | 1.0 | ... |
| 2 ≦ ITEM POSSESSED QUANTITY < 5 | 0.8 | ... |
| 5 ≦ ITEM POSSESSED QUANTITY | 0.6 | ... |
| ⋮ | ⋮ | ⋮ |

SEVENTH SUB CONVERSION RATE SETTING DATA

| SELECTION CONDITION | SEVENTH SUB CONVERSION RATE | ... |
|---|---|---|
| ITEM LEVEL=NOT SET | 1.0 | ... |
| 5≦ITEM LEVEL<10 | 1.05 | ... |
| 10≦ITEM LEVEL<20 | 1.10 | ... |
| ⋮ | ⋮ | ⋮ |

EIGHTH SUB CONVERSION RATE SETTING DATA

| SELECTION CONDITION | EIGHTH SUB CONVERSION RATE | ... |
|---|---|---|
| INPUT ELEMENT INPUT QUANTITY=1 | 1.0 | ... |
| INPUT ELEMENT INPUT QUANTITY=2 | 2.05 | ... |
| ⋮ | ⋮ | ⋮ |

NINTH SUB CONVERSION RATE SETTING DATA

| SELECTION CONDITION | NINTH SUB CONVERSION RATE | ... |
|---|---|---|
| WITHIN INFORMATION RANGE DESIGNATED BY ADVERTISEMENT | 1.1 | ... |
| OUT OF INFORMATION RANGE DESIGNATED BY ADVERTISEMENT | 0.8 | ... |
| N/A (NO DESIGNATION OR POOR POSITIONING) | 1.0 | ... |
| ⋮ | ⋮ | ⋮ |

CONVERSION DEFINING DATA <BARTER TYPE>

APPLICATION CONDITION — 571

| | | |
|---|---|---|
| INPUT ELEMENT TYPE | CHARACTERS, SKILLS, BONUS POINT 100 P | 572a |
| TIMING CONDITION | WHEN A STAGE IS FINISHED | 572b |
| WATCHED DATE CONDITION | 12/23 TO 12/25 | 572c |
| WATCHED TIME ZONE CONDITION | 18:00 TO 24:00 | 572d |
| ADVERTISEMENT ID CONDITION | SPECIFIC ADVERTISEMENT ID LIST (NO. 1) | 572e |
| SPONSOR CONDITION | SPECIFIC SPONSOR ID (NO. 1) | 572f |
| CATEGORY CONDITION | ADVERTISEMENT CATEGORY (NO. 1) | 572g |
| WATCHING SETTING CONDITION | MOVIE, 90 SECONDS, DISPLAY SIZE: LARGE | 572h |
| ATTRIBUTE COMPATIBILITY CONDITION | ATTRIBUTE COMPATIBILITY = GOOD | 572j |
| POSSESSED QUANTITY CONDITION | ITEM POSSESSED QUANTITY = 1 | 572k |
| LEVEL CONDITION | ITEM LEVEL = NOT SET | 572m |
| INPUT QUANTITY CONDITION | INPUT ELEMENT INPUT QUANTITY = 1 | 572n |
| POSITIONAL CONDITION | WITHIN INFORMATION RANGE DESIGNATED BY ADVERTISEMENT | 572p |

⋮

| | | |
|---|---|---|
| OUTPUT ELEMENT TYPE | DEFENSE ITEM 001 | 590 |
| OUTPUT ELEMENT QUANTITY | 1 | 592 |

⋮

SYSTEM FOR GIVING ENTERTAINMENT ELEMENT IN RETURN FOR WATCHING ADVERTISEMENT

Japanese Patent Application No. 2016-256826 filed on Dec. 28, 2016 is hereby incorporated by reference in its entirety.

BACKGROUND

A "reward advertisement" has become a popular means for gaining profits in an online game. The reward advertisement is an advertisement that is displayed on an advertisement screen in a computer such as a user terminal, and features a reward given to a user who has watched the advertisement, accessed a website presented by the advertisement, or installed an application presented by the advertisement (see Japanese Translation of PCT International Application Publication No. JP-T-2003-529093 for example).

In the above-described reward advertisement, the content of the reward advertisement does not basically change within a determined advertising period. Thus, a user playing a game watches the same advertisement over and over again. The advertisement could be regarded as an entertainment when it is seen for the first time. However, watching the same advertisement over and over again is nothing more than a cumbersome obligation. Thus, the user is extremely less incentivized to watch the advertisement despite the reward, and might start skipping the advertisement to be watched or might even feel negative about the advertised product.

A conventional reward advertisement has the content of the reward determined in advance, or the user can know the content of the advertisement only after the reward is given. For example, any item that can be used in the game is given to the player as a reward, without the player knowing whether or not the reward is valuable to him or her. Thus, the player has to watch an advertisement without knowing whether or not the reward is valuable to him or her.

This is a problem not only in game-related advertisements, but is also a problem in other situations. For example, the same problem arises also when a given advertisement is to be watched while an image of a desired website or an image generated by a program executed on the website is watched using a web browser on a display screen for user operations.

SUMMARY

According to one aspect of the invention, there is provided a computer system comprising: at least one processor or circuit programmed to execute as:

controlling implementation of a game;

selecting an input element from an entertainment element, related to the game, possessed by a user;

performing watching control for a watching target advertisement to convert the input element into an output element that is the entertainment element different from the input element in return for watching an advertisement; and giving the output element to the user when watching of the watching target advertisement satisfies a completion equivalent condition.

According to another aspect of the invention, there is provided a computer system comprising: at least one processor or circuit programmed to execute as:

selecting an input element from a plurality of pieces of disposable information possessed by the user;

performing watching control for displaying, on a display screen for user operations, an advertisement to convert the input element into an output element that is the disposable information different from the input element in return for watching the advertisement; and giving the output element to the user when watching of the advertisement satisfies a completion equivalent condition.

BRIEF DESCRIPTION OF THE DRAWINGS

FIG. 3 is a diagram illustrating a mechanism of an advertisement.

FIG. 12 is a diagram illustrating an example of a data structure of first sub conversion rate setting data.

FIG. 13 is a diagram illustrating an example of a data structure of second sub conversion rate setting data.

FIG. 14 is a diagram illustrating an example of a data structure of third sub conversion rate setting data.

FIG. 15 is a diagram illustrating an example of a data structure of fourth sub conversion rate setting data.

FIG. 16 is a diagram illustrating an example of a data structure of fifth sub conversion rate setting data.

FIG. 17 is a diagram illustrating an example of a data structure of sixth sub conversion rate setting data.

FIG. 18 is a diagram illustrating an example of a data structure of seventh sub conversion rate setting data.

FIG. 19 is a diagram illustrating an example of a data structure of eighth sub conversion rate setting data.

FIG. 20 is a diagram illustrating an example of a data structure of ninth sub conversion rate setting data.

FIG. 21 is a second diagram illustrating an example of a data structure of conversion defining data.

DESCRIPTION OF EXEMPLARY EMBODIMENTS

Figure 1:
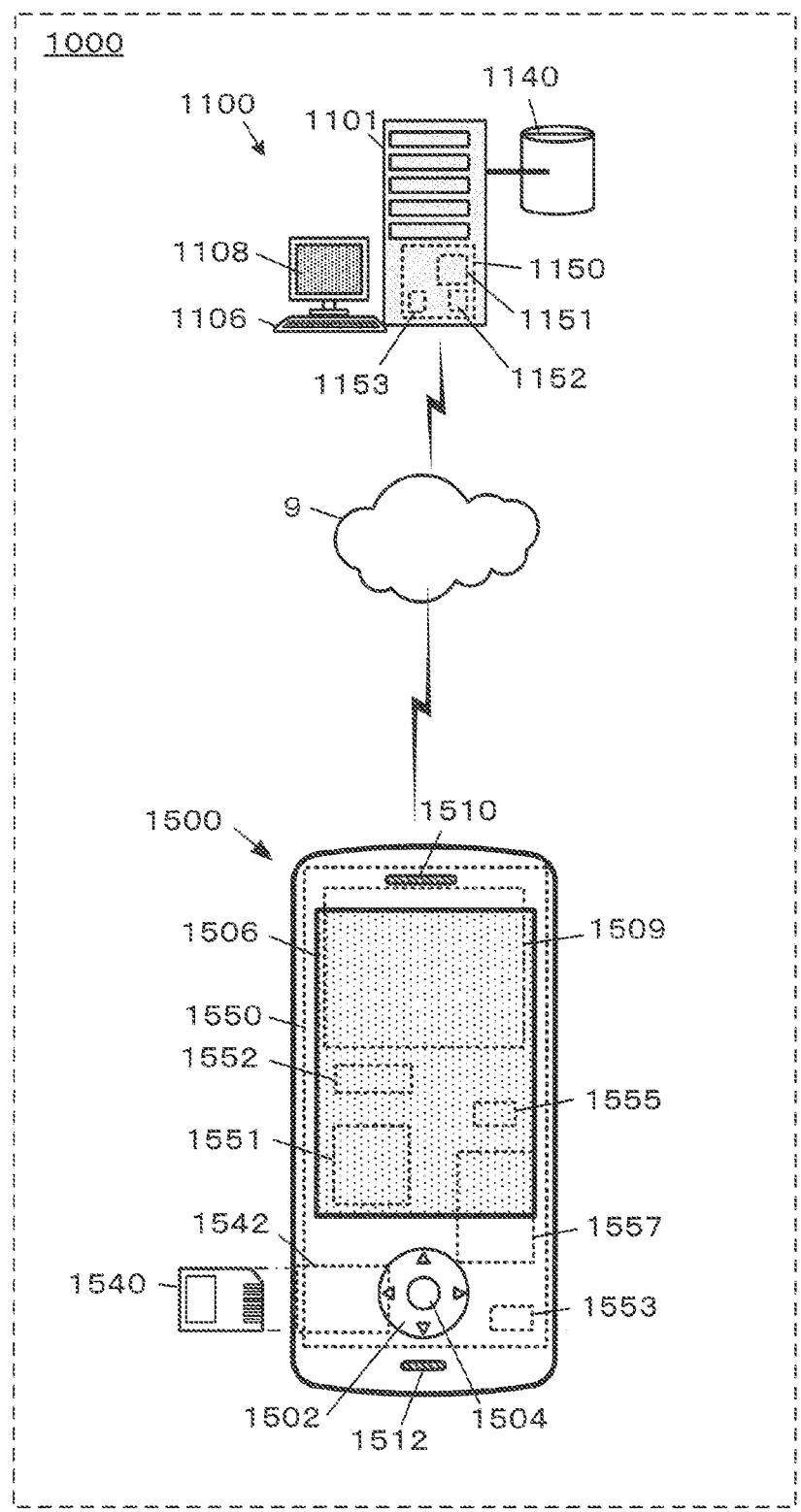
FIG. 1 is a diagram illustrating an example of a configuration of a game system.

The present embodiment can provide a new technique of incentivizing a user to watch an advertisement.

According to one embodiment of the invention, there is provided a computer system comprising: at least one processor or circuit programmed to execute as:

controlling implementation of a game;

selecting an input element from an entertainment element, related to the game, possessed by a user;

performing watching control for a watching target advertisement to convert the input element into an output element that is the entertainment element different from the input element in return for watching an advertisement; and giving the output element to the user when watching of the watching target advertisement satisfies a completion equivalent condition.

The "computer system" as used herein may be a system including a single computer, and may be a system including a plurality of computers that are connected to each other to be capable of performing data communications with each other through a communication line.

The "entertainment element" as used herein includes an item usable in the game, an ability of a player character or the like (such as moves, magic spells, and skills for example), a parameter value related to the game, an appearance changing element for the player character or the like, a ticket for playing minigames and special stages, data on character voice read by a voice actor, a BGM data, and the like.

With this configuration, the improvement control is performed for the input element, selected from entertainment elements possessed by the user, in return for advertisement watching, whereby the player can be incentivized to watch the advertisement.

The "completion equivalent condition" as used herein includes a timing at which advertisement watching ends, and also includes a timing that can be technically regarded as the end of advertisement watching. For example, a 30 seconds elapsed point after a 30-second movie advertisement has started to be displayed can be counted as the timing at which the watching control is completed, of course. Such an advertisement may include last five seconds involving fade out or a sponsor company logo being displayed until the end, and thus can be regarded as a scene after the displaying of the content of the advertisement has technically ended. In such a case, technically, the main portion of the advertisement has been completely presented at a point where 25 seconds have elapsed. Thus, the point is regarded as the advertisement watching completed timing, and thus is regarded as a timing at which the completion equivalent condition is satisfied.

The computer system may further comprise selecting the watching target advertisement based on an operation input by the user.

In the computer system, the selecting the watching target advertisement may include selecting a category and/or a sponsor related to an advertisement content based on the operation input by the user to select the watching target advertisement.

With this configuration, the user can select the watching target advertisement. Thus, the user can watch an advertisement he or she is somewhat impressed or interested in, unlike in a case where an advertisement is unilaterally displayed. Thus, the user can be more incentivized to watch the advertisement.

The computer system may further comprise selecting the output element based on the watching target advertisement.

With this configuration, the output element can be changed based on the watching target advertisement. Thus, the output element changes when the advertisement changes, so that the user can be more incentivized to watch the advertisement.

The computer system may further comprise performing watching setting for the watching target advertisement.

With this configuration, the watching setting related to the advertisement watching control, that is, setting on a watched environment indicating how the output control for the advertisement is performed can be achieved.

The computer system may further comprise selecting the output element based on the watching setting.

With this configuration, the output element can be changed with the watching setting, whereby the user can be more incentivized to watch an advertisement.

In the computer system, the watching setting may include time setting related to time at which the watching target advertisement is output, the selecting the output element may include selecting the output element based on the time setting.

The "time setting" as used herein may be regarded as a required watching time by the user.

With this configuration, the output element can be changed in accordance with how long the user watches the advertisement. For example, an output element related to an advertisement with a relatively long running time may be set to be of a higher quality or larger quantity than an output element related to an advertisement with a short running time. Once the user understands that the advertisement with a longer running time featuring a higher customer appeal corresponds to conversion into an output element with a higher quality, he or she understands the advantage of watching the advertisement with a long running time. This can make the user feel that he or she "can get a good item in return for watching this advertisement" and to be convinced to watch the advertisement. Thus, the user recognizes the advertisement as a reasonable compensation, rather than something he or she is forced to watch. Thus, the user can be more incentivized to watch the advertisement.

In the computer system, the watching setting may include timing setting including at least one of a timing in the game at which the watching target advertisement is output, date and time at which the watching target advertisement is output, and a time zone in which the watching target advertisement is output, the selecting the output element may include selecting the output element based on the timing setting.

Thus, the same advertisement can result in different output elements, depending on when and how the output control for the watching target advertisement is performed. Thus, a wide variety of output elements can be achieved, whereby the user can be more incentivized.

In the computer system, the watching setting may include setting related to an output mode of the watching target advertisement, the selecting the output element may include selecting the output element based on the output mode.

With this configuration, a difference in data format (movie, still image, audio only) and output mode (display size and display position) can have an impact on the selection of the output element. For example, an output element as a result of displaying an advertisement with a large display size can be set to be of a higher quality or quantity than an output element as a result of displaying an advertisement with a small display size. Once the user understands that the advertisement with a longer running time featuring a higher customer appeal corresponds to conversion into an output element with a higher quality, he or she understands the advantage of watching the advertisement with a long running time. This can make the user feel that he or she "can get a good item in return for watching this advertisement" and to be convinced to watch the advertisement. Thus, the user recognizes the advertisement as a reasonable compensation, rather than something he or she is forced to watch. Thus, the user can be more incentivized to watch the advertisement.

In the computer system, the selecting the input element may include selecting the input element based on the operation input by the user, the computer system may further comprise selecting the output element at least based on the input element.

With this configuration, the output element can be selected based on an input element selected by the user. For example, the user can convert an entertainment element he or she no longer needs into a different entertainment element. Thus, the conversion for converting an input element into an output element can be more useful to indirectly make the user more incentivized to watch an advertisement.

In the computer system, the selecting the output element may include selecting the output element based on a quantity of the entertainment element possessed by the user that is same as the input element and/or a quantity of the entertainment elements selected as the input element.

With this configuration, an output element can be selected based on importance of the input element to the user.

In the computer system, the selecting the output element may include selecting the output element based on compatibility determined between the input element and the watching target advertisement.

With this configuration, the user can be even more incentivized due to an interesting factor of the input element based on compatibility with the watching target advertisement.

In the computer system, the watching target advertisement may be associated with information indicating a designated position, the computer system may further comprise: acquiring positional information indicating a position of the user; and selecting the output element based on positional relationship between the position indicated by the positional information and the designated position.

With this configuration, the output element can be changed in accordance with positional relationship between a position associated with an advertisement to be watched and a position of the user. Thus, a wide variety of patterns can be achieved for the conversion from the input element to the output element. Thus, the advertisement watching can be more interesting to more incentivize the user.

In the computer system, the entertainment element may be associated with a valid period during which the entertainment element is selectable as the input element, the selecting the input element may include selecting the input element from entertainment elements the valid period of which has not been expired yet.

With this configuration, the period during which the entertainment element can be used as the input element can be set. Thus, the user who tends to worry about the expiration of the period is incentivized as follows, to check the entertainment element possessed by the user, and actively utilize the system for converting the input element into the output element in return for advertisement watching. This further has an effect of increasing an opportunity for the user to watch advertisements.

The computer system may further comprise displaying a preview of the output element given when the completion equivalent condition is satisfied, before the watching of the watching target advertisement satisfies the completion equivalent condition.

With this configuration, the output element can be presented to the user in advance. The player watches an advertisement while knowing the input element and the output element in advance. Thus, the advertisement is watched with the user satisfied with the give-and-take relationship, than in the case with the conventional reward advertisement not enabling the player to know what is given until the reward is actually given. This point also contributes to further incentivize the player to watch the advertisement.

According to another embodiment of the invention, there is provided a computer system comprising: at least one processor or circuit programmed to execute as:

selecting an input element from a plurality of pieces of disposable information possessed by the user;

performing watching control for displaying, on a display screen for user operations, an advertisement to convert the input element into an output element that is the disposable information different from the input element in return for watching the advertisement; and giving the output element to the user when watching of the advertisement satisfies a completion equivalent condition.

With this configuration, a computer system that can achieve the same effects as the first invention can be implemented.

The advertisement output control system may comprise a server system that is the computer system and a user terminal to which the user inputs an operation, the server system and the user terminal may be connected to the advertisement output control system to be capable of performing a communication with each other.

With this configuration, the system connected with the server system and the user terminal to perform communications with each other can achieve the effects described above.

The advertisement output control device may comprise an operation input section to which the user inputs an operation, the advertisement output control device being the computer system.

With this configuration, the advertisement output control device including the operation input section to which the user inputs an operation can achieve the effects described above.

An exemplary embodiment of the present invention is described below. It is a matter of course that modes to which the present invention can be applied are not limited to the embodiments described below.

First Embodiment

An example of output control for a given advertisement in a game starting based on a gameplay start operation by a player is described as a first embodiment. In the present embodiment, a single-play action roll playing game (ARPG) is described as an example of the game. However, genre of the game according to the present invention and how it is played are not limited to this.

[Hardware Configuration]

First of all, an example of a hardware configuration according to the present embodiment is described.

FIG. 1 is a diagram illustrating an example of a configuration of a game system functioning as an advertisement output control system according to the present embodiment. A game system 1000 according to the present embodiment is a computer system including a server system 1100 and a user terminal 1500 that can be connected to a communication line 9 to communicate with each other to exchange data. The illustrated example includes a single user terminal 1500. However, in an actual operation, a plurality of user terminals 1500 of different users who play the game (hereinafter, referred to as "players") may each be connected to and communicate with the server system 1100. The game system 1000 as a whole may be referred to as a computer system, or the sever system 1100 and the user terminal 1500 may each be referred to as an individual computer system.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 includes microprocessors of various types (e.g., a CPU 1151, a GPU, and a DSP), an IC memory 1152 of various types (e.g., a VRAM, a RAM, and a ROM), and a communication device 1153. The control board 1150 may partially or entirely be implemented with an application specific integrated circuit (ASIC), a field-programmable gate array (FPGA), and a system on a chip (SoC).

Through a calculation process performed by the control board 1150 based on a predetermined program and data, the server system 1100 implements 1) a user management function of managing information on a process or a user related to user registration and the like, 2) an online shopping function of selling various items, usable in the game, to the user online, and 3) a game management function of providing data required to play the game with the user terminal 1500, to manage play control on the game played with the user terminal 1500. Thus, the game according to the present embodiment is implemented as one type of client-server games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The server system 1100 is not limited to a configuration managed by a single administrator, and may be a system in which servers managed by different administrators are connected to each other in such a manner as to be able to communicate with each other. For example, the game and the online shopping may be managed by different administrators and implemented with difference servers connected to each other in such a manner as to be able to communicate with each other to function as an integrated server system.

The user terminal 1500 is a computer system, usable by a registered user serving as a player to play the game, and is an electronic device (electronic apparatus) that can access the server system 1100 via the communication line 9 to implement a game. The user terminal 1500 according to the present embodiment is a device known as a smartphone. The user terminal 1500 may also be a portable game device, a game controller, a personal computer, a tablet computer, a wearable computer, an arcade game device, or the like.

The user terminal 1500 includes an arrow key 1502, a button switch 1504, a touch panel 1506 that functions as an image display device and as a touch position input device, a speaker 1510, a built-in battery 1509, a microphone 1512, a control board 1550, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game.

The control board 1550 includes a processor of various types (e.g., a CPU 1551, a GPU, and a DSP); an IC memory 1552 of various types (e.g., a VRAM, a RAM, and a ROM), a wireless communication module 1553 for performing wireless communications with a mobile phone base station, a wireless LAN base station, or the like connected to the communication line 9, a position measurement module 1555; an interface circuit 1557; and the like.

The position measurement module 1555 can receive a signal provided from the position measurement system, and can output position measurement information at a predetermined interval (for example, once a second). The position measurement system according to the present embodiment is a Global Positioning System (GPS) Thus, the position measurement module 1555 may be a known "GPS module", a "GPS receiver", or the like. The "position measurement information" includes measurement date and time (Coordinated Universal Time (UTC)), positional coordinates (latitude/longitude/altitude), and the like. The positional coordinates obtained by the position measurement module 1555 are hereinafter referred to as "player positional information".

The interface circuit 1557 includes circuits such as a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a signal input-output circuit that inputs and outputs a signal to and from the memory card reader 1542, and a signal input-output circuit that inputs and outputs a signal to and from the position measurement module 1555.

The elements mounted on the control board 1550 are electrically connected with each other via a bus circuit or the like to be capable of reading and writing data and exchanging signals. The control board 1550 may partially or entirely be implemented with an ASIC, an FPGA, or a SoC. The control board 1550 stores a client program and various types of data, for implementing a function as the user terminal of the game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

Figure 2:
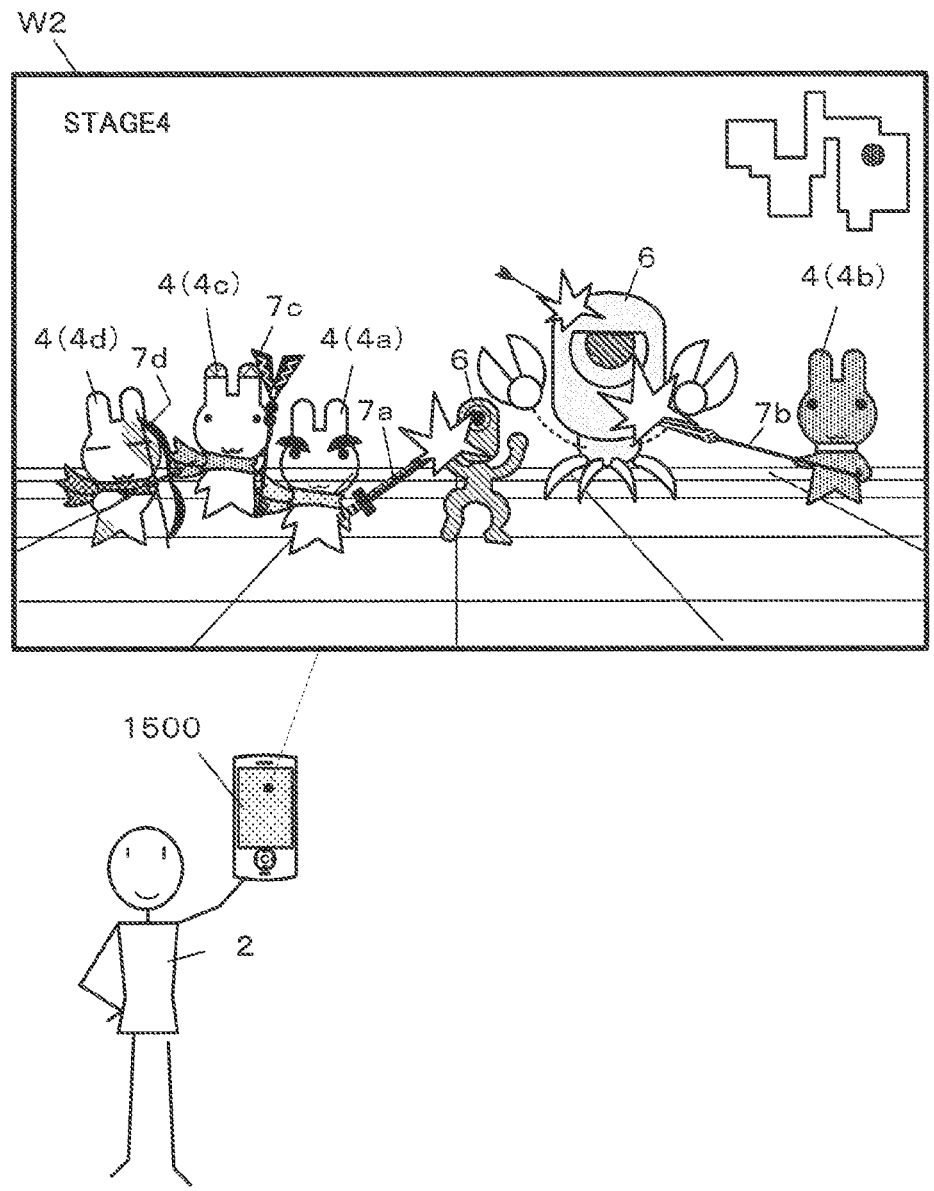
FIG. 2 is a diagram illustrating a content of a game.

FIG. 2 is a diagram illustrating a content of the game according to the present embodiment. The game according to the present embodiment is a single-play action roll playing game (ARPG) that is played by a player 2 using the user terminal 1500. Note that the game may be a multi-play game or a game of another genre.

In the game according to the present embodiment, the player 2 picks up a predetermined number of characters, from his or her possessed characters, to build a deck (a group, a party, or a team of player characters), and selects and plays a game stage. The player 2 operates the characters in the deck thus built, serving as player characters 4 (4a, 4b, . . . ), to achieve a goal set to the stage (such as finding a predetermined treasure or defeating a boss character, for example) while fighting with an enemy character 6 that is a non-player character (NPC) confronted in a game space of the stage.

The player 2 can enjoy the game by making the player characters 4 (4a, 4b, . . . ) equip various items 7 (7a, 7b, . . . ), usable in the game, purchased with online shopping or obtained during the gameplay. The player character 4 equipping or using a stronger item 7 can have more improved abilities, so that the player 2 can be more advantageous while playing the game. The player characters 4 (4a, 4b, . . . ) automatically obtain experience in accordance with a result of the gameplay, to grow and have higher abilities. In this context, it is important to acquire more powerful items 7.

The player characters 4 (4a, 4b, . . . ) and the items 7 (7a, 7b, . . . ) can be powered up and grown in accordance with a "traveled distance" of the player 2 or using a "bonus point".

The "traveled distance" as used herein is a distance obtained by a result of the measurement by the position measurement module 1555 for the movement of the player 2 holding the user terminal 1500 with the game turned ON. The traveled distance is automatically accumulated as much as the user travels. A designated player character 4 can grow/evolve by consuming a predetermined unit of the traveled distance each time. Thus, depending on the content of the game, the traveled distance may be regarded as a sort of food for growing the player character 4. In a game where the player character 4 is used as a weapon, the traveled distance may be regarded as a virtual money/resource spent for remodeling/powering up/development.

The "bonus point" as used herein is a point given when purchasing of an entertainment element such as an item related to the game in the online shopping satisfies a predetermined condition. A designated player character 4 or item 7 can power up/grow with a predetermined unit of the bonus point consumed each time, as in the case of the traveled distance. How the point is referred to is not limited to this. Points usable in a similar way can be given as appropriate under conditions other than the online shopping. For example, the points may be given for free in response to a user login, given as a gift selected through a free lottery after user logout, and given for free as a campaign.

FIG. 3 is a diagram illustrating a system of an advertisement according to the present embodiment.

A conventional advertisement watched in exchange for a reward, which is what is known as a reward advertisement is provided with a reward determined in advance or randomly determined. Thus, the players 2 have not been able to freely determine the content of the reward. The reward advertisement according to the present embodiment enables the players to select an "input element" and change an advertisement watching timing, to change an "output element" that is acquired in return for the advertisement watching.

The "input element" according to the present embodiment is an entertainment element, related to the game, possessed by the user.

The "entertainment element" can be set as appropriate in accordance with the content of the game. The game according to the present embodiment is an ARPG, and thus the following elements can be set 1) what is known as an item such as a weapon, armor, goods, and a magic spell book usable by the player character 4, 2) an ability that can be additionally provided to the player character 4 (such as moves, magic spells, and skills for example), 3) improvement of the ability of the player character 4, 4) an additional outer-view changing element for the player character 4 (such as custom model data and coloring pattern for example), 5) a ticket for playing minigames and special stages, 6) data on a character voice read by a voice actor, 7) BGM data, 8) game currency, 9) a play time extension ticket, 10) a predetermined unit of the traveled distance, 11) a predetermined unit of the bonus point, and the like. The entertainment elements are hereinafter collectively referred to as an "item". Other examples of the "entertainment element" include a free game ticket for other games, a ticket for participating in an event outside the game, and the like may also be set.

The "output element" is acquired by the player in return for watching an advertisement and consuming the input element. If the advertisement watching 12 serves as a function, the output element is a conversion result obtained with the function. Possible examples of the output element according to the present embodiment include an entertainment element related to the game as well as "disposable information" also usable outside the game. The entertainment element and the disposable information that can be the output element are hereinafter collectively referred to as an "item".

The "disposable information" as used herein is information equivalent to a virtual asset possessed by the user. The information includes membership points, coupons, and virtual currencies, given in accordance with a used frequency. If the application is limited to games, entertainment elements related to the game can also be regarded as the disposable information.

In the present embodiment, the player 2 selects one or a plurality of possessed items to be the input element 10 ("A" in the illustrated example) and performs a selection/designation operation. Then, the player 2 can obtain the output element 14 ("B" in the illustrated example), which is an item different from the item set to be the input element, in return for the consumption of the input element 10 and the advertisement watching 12. In other words, the player 2 can convert the input element 10 into the output element 14, with the advertisement watching 12 serving as a requirement or cost for the conversion. Such a system is hereinafter referred to as "item conversion".

The type and quantity of an item to be the output element 14 is determined based on any one of 1) advertisement information on a watching target advertisement that is an advertisement serving as a target of the output control (watching target), 2) watching setting information related to advertisement output control, 3) input element information that is information related to the input element, 4) compatibility determined between the watching target advertisement and the input element, and 5) positional relationship between positional information set to the watching target advertisement and user positional information.

For example, the "advertisement information" includes at least one of a category of the content of the advertisement, a sponsor, and required watching time.

The "watching setting information" roughly includes at least one of information related to an output format of the advertisement and a setting on time when the advertisement is provided. An example of the former may include at least one of an advertisement type (one of movie, still image, and audio only), display size, display position, whether the advertisement is a single advertisement or advertisements watched in series, and whether the advertisement is output individually or collectively. An example of the latter may include at least one of a timing (such as a situation in the game) at which the advertisement is provided, watched date and time, and a watched time zone.

An example of the "input element information" may include at least one of a type of an item set to be the input element 10, a quantity of the item, a quality and a status of the item (such as a level or a rarity of an item), the number of the items possessed by the player, and a valid period set to the item.

The "positional information set to the watching target advertisement" includes information corresponding to the positional coordinates and the altitude in the player positional information. When the watching target advertisement is an automobile, positional information on a dealer shop or a showroom of the automobile or a large advertisement may be set.

Figure 4A:
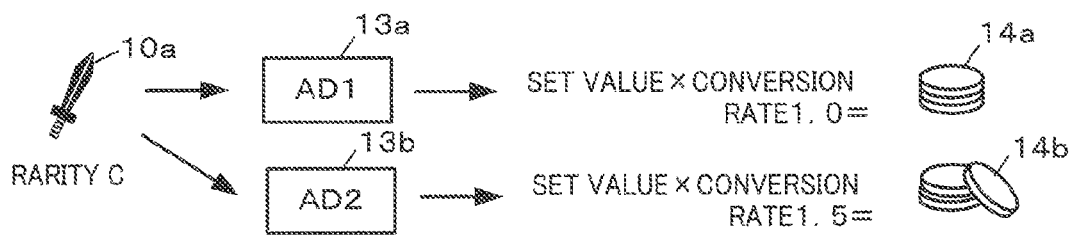
FIG. 4A is a diagram illustrating how an input element is converted into an output element.
Figure 4B:
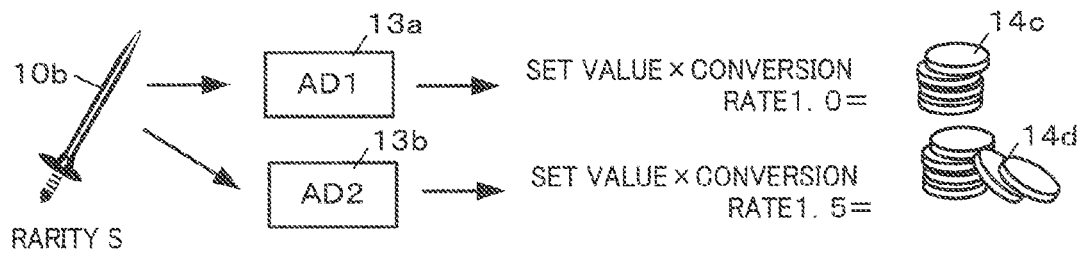
FIG. 4B is a diagram illustrating how an input element is converted into an output element.
Figure 4C:
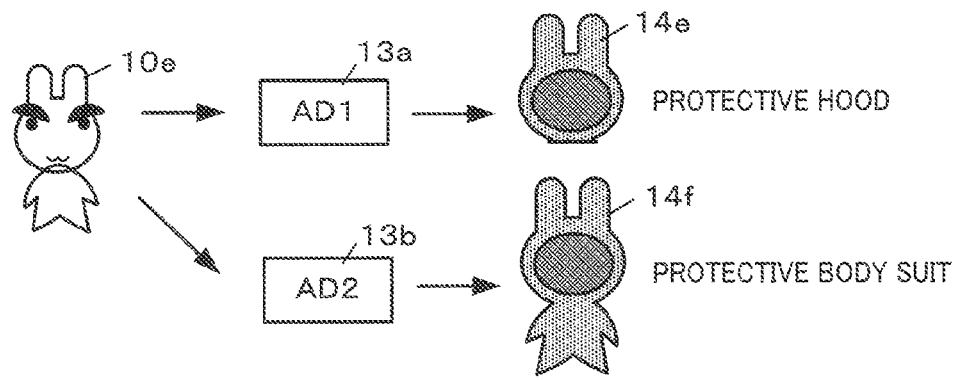
FIG. 4C is a diagram illustrating how an input element is converted into an output element.

FIGS. 4A to 4C are each a diagram illustrating item conversion for converting an input element into an output element according to the present embodiment in detail. The conversion for converting the input element into the output element according to the present embodiment roughly includes two types of conversion including a "point giving type" as illustrated in FIGS. 4A and 4B and a "barter type" as illustrated in FIG. 4C. Note that a configuration employing only one of these types may be employed.

With the "point giving type" conversion, the output element 14 is given as a point of some sort obtained by multiplying a given set value set to the input element 10 by a conversion rate corresponding to the watching target advertisement or the like. The type of such a point is not limited. The point includes a shopping point usable in online shopping as a typical example, and may further include a membership point that can be used for enjoying various services in a system for registered members outside the game, a credit card point given by a credit card company based on card spending, a deemed traveled distance, and the like.

Specifically, as described above, the information such as the advertisement information, the watching setting information, the input element information, the compatibility, and the positional relationship impacts the selection of the output element 14. A conversion rate is derived from the level of such an impact. In the illustrated example, this is indicated by the difference among the watching target advertisements 13 (13*a*, 13*b*, . . . ). Thus, as illustrated in FIG. 4A, the same input element 10*a* can result in different conversion rates depending on a difference in an advertisement to be watched or the like. This results in a difference in the quantity of a point (represented by a design in a form of a coin in the illustrated example) obtained as the output element 14 (14*a*, 14*b*, . . . ). Even when the information such as the advertisement information, the watching setting information, the input element information, the compatibility, and the positional relationship is the same, an input element 10*b* that has different set values of an item (effectiveness, rarity, or the like of a set item, for example) as illustrated in FIG. 4B results in different quantities of the point obtained as the output element 14 (14*c*, 14*d*, . . . ).

In the "barter type" conversion, the output element 14 other than the point is given. The barter type conversion has a pattern for converting the input element 10 (10*e*) into the output element 14 (14*e*, 14*f*, . . . ) determined in advance based on a combination of pieces of information such as the advertisement information, the watching setting information, the input element information, the compatibility, and the positional relationship.

Thus, in the present embodiment, the advertisement watching serves as an opportunity for the player to get a new item by getting rid of items that are no longer used, items that are relatively easily acquirable in the gameplay, or the like. Furthermore, the output element 14 largely varies in accordance with which input element 10 the player 2 selects or which advertisement the player 2 watches and when, where, and how. Thus, the same advertisement does not necessarily result in the same output element 14. This makes the advertisement watching entertaining to users by making them feel like they are opening a box of present, until the conversion pattern is figured out. All things considered, the user can be more incentivized to watch an advertisement.

The factors impacting the selection of the output element 14 may include information other than the advertisement information, the watching setting information, the input element information, the compatibility, and the positional relationship as appropriate. Alternatively, some of these factors may be omitted and the remining ones may be employed.

Next, an example of a process related to conversion for converting an input element into an output element in return for the advertisement watching as well as an example of a display screen for user operations according to the present embodiment will be described in detail.

When the game according to the present embodiment starts, a timing at which the advertisement watching is possible is automatically determined. The timing at which the advertisement watching is possible, which may be set as appropriate in accordance with the content of the game, a design of a menu system, or the like, is preferably set to be at a timing involving no urgent input operation. For example, such a timing while playing the game according to the present embodiment, which is an ARPG, may be set to be while a stage map is being displayed, during movement within the map, a timing at which the player enters or exits a facility in the map, a timing at which the player in a battle can be regarded as being in a predetermined difficult situation, after a battle, a timing of displaying the result of the finished stage, while a screen for selecting the next stage or changing equipment is being displayed, during data loading, or the like. Preferable examples of such a timing, not during the gameplay, include immediately after the user login, while a screen for deck building or equipment change is being displayed before the gameplay starts, during online shopping, while a screen for selecting a stage to be played or for powering up or evolving the item 7 is being displayed, during data loading, and the like.

Figure 5:
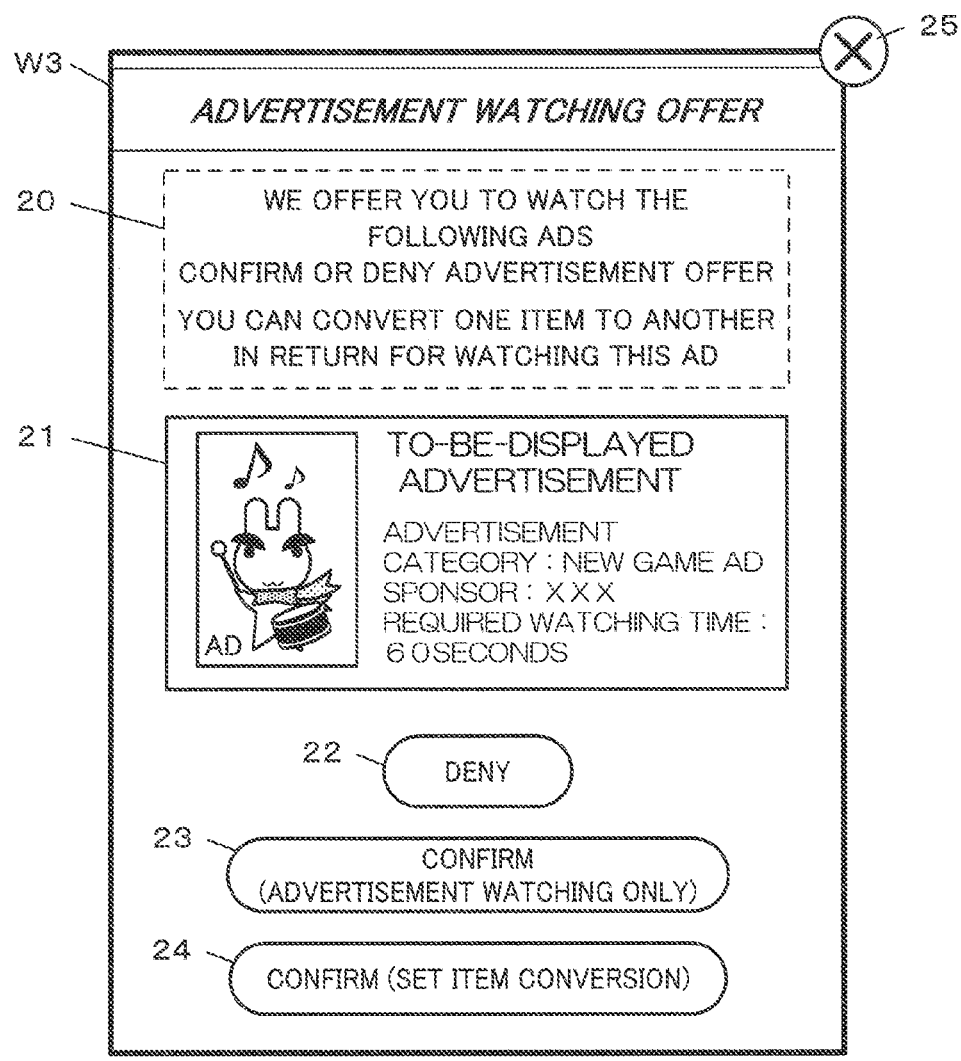
FIG. 5 is a diagram illustrating a display example of an advertisement offer screen.

When the timing at which the advertisement watching is possible is determined to have arrived, an advertisement offer screen W3 as illustrated in FIG. 5 for example is displayed on the user terminal 1500. The advertisement offer screen W3 is a screen for performing a confirmation operation for the advertisement watching, and includes a screen description 20, a to-be-watched advertisement description section 21, a watching denial operation icon 22, a first confirmation operation icon 23, a second confirmation operation icon 24, and a screen delete operation icon 25.

The screen description 20 is a section where guidance for an input operation on the screen is displayed. In the advertisement offer screen W3, the section provides description for instructing the player to input confirm/deny for the advertisement watching to be started, and description indicating that the item conversion setting, as a result of the advertisement watching confirmed, can be set.

The to-be-watched advertisement description section 21 is a section displaying simple information on an advertisement set to be the watching target. For example, a screen (a still image or a short movie) representing the advertisement, a category of the advertisement, information on the sponsor, information on required watching time are preferably displayed. Note that the information to be displayed can be appropriately selected from those described above, and may include information other than those described above.

The watching denial operation icon 22 is an icon operated for denying the advertisement watching offered.

The first confirmation operation icon 23 is an icon operated for performing the advertisement watching without the item conversion setting.

The second confirmation operation icon 24 is an icon operated for performing the advertisement watching and the item conversion setting.

Figure 6:
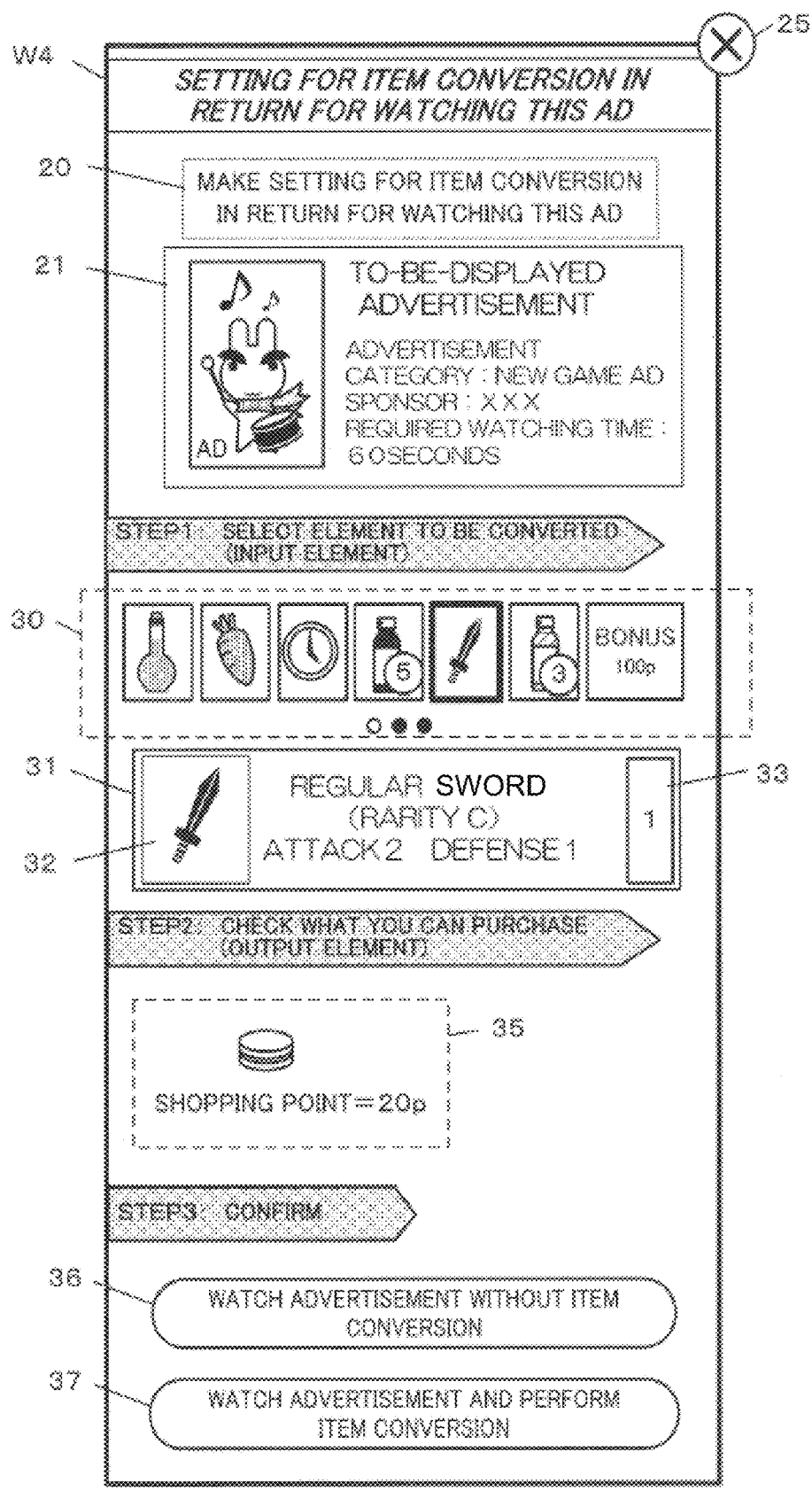
FIG. 6 is a diagram illustrating a display example of a setting screen according to a first embodiment.

The screen delete operation icon 25 is an icon operated for deleting the screen. The advertisement watching is regarded as being denied when the screen delete operation icon 25 is operated When an operation on the second confirmation operation icon 24 is detected, a setting screen W4 as illustrated in FIG. 6 is displayed on the user terminal 1500. The setting screen W4 includes the screen description 20, the to-be-watched advertisement description section 21, the screen delete operation icon 25, an input element option presenting section 30, an input element description section 31, a preview section 35 showing a preview of an item about to be obtained as the output element, a conversion skip operation icon 36, and a conversion execution operation icon 37.

The input element option presenting section 30 includes items, which are input element options, displayed side by side. The input element option presenting section 30 supports a scroll operation, and options other than those on the screen can be displayed by horizontally scrolling this section.

The input element description section 31 is simple information displaying section for an item currently set to be the input element. In the example illustrated in FIG. 6, an image 32 of the item, the name, rarity, ability setting value, and a quantity 33 of an item set as the input element.

In the present embodiment, any one type of the options is automatically selected to be initially set as the input element. Note that the player can perform a predetermined input element setting operation (for example, an operation of dragging and dropping an image of an option displayed in the input element option presenting section 30 into the input element description section 31) to set a desired item to be the input element.

The conversion skip operation icon 36 is operated by the player who has input an operation for performing the advertisement watching involving the item conversion setting, on the advertisement offer screen W3, but changed his or her mind to perform the advertisement watching only.

The conversion execution operation icon 37 is for inputting an operation for performing the advertisement watching involving the item conversion with the setting on the setting screen reflected. When an operation on the conversion execution operation icon 37 is detected, the setting screen W4 is deleted and the advertisement watching starts. When the advertisement watching is completed, the input element 10 selected and set on the setting screen W4 is consumed, so that the output element 14 given to the player.

As used herein "the advertisement is entirely watched" means that a completion equivalent condition for the watching control is satisfied (a timing satisfying the condition has arrived). The concept of the timing at which the watching control ends includes a timing at which the advertisement watching has been technically completed. For example, a timing at which 30 seconds elapse after a 30-second movie advertisement has started to be displayed can be counted as the timing at which the watching control is completed, of course. Such an advertisement may include last 5 seconds involving fade out or a sponsor company logo being displayed until the end, and thus can be regarded as a scene after the displaying of the content of the advertisement has technically ended. In such a case, technically, the main portion of the advertisement has been completely presented at a point where 25 seconds have elapsed. Thus, the point is regarded as the watching control completed timing, and thus is regarded as a timing at which the completion equivalent condition is satisfied so that "advertisement is entirely watched".

[Functional Configuration]

Figure 7:
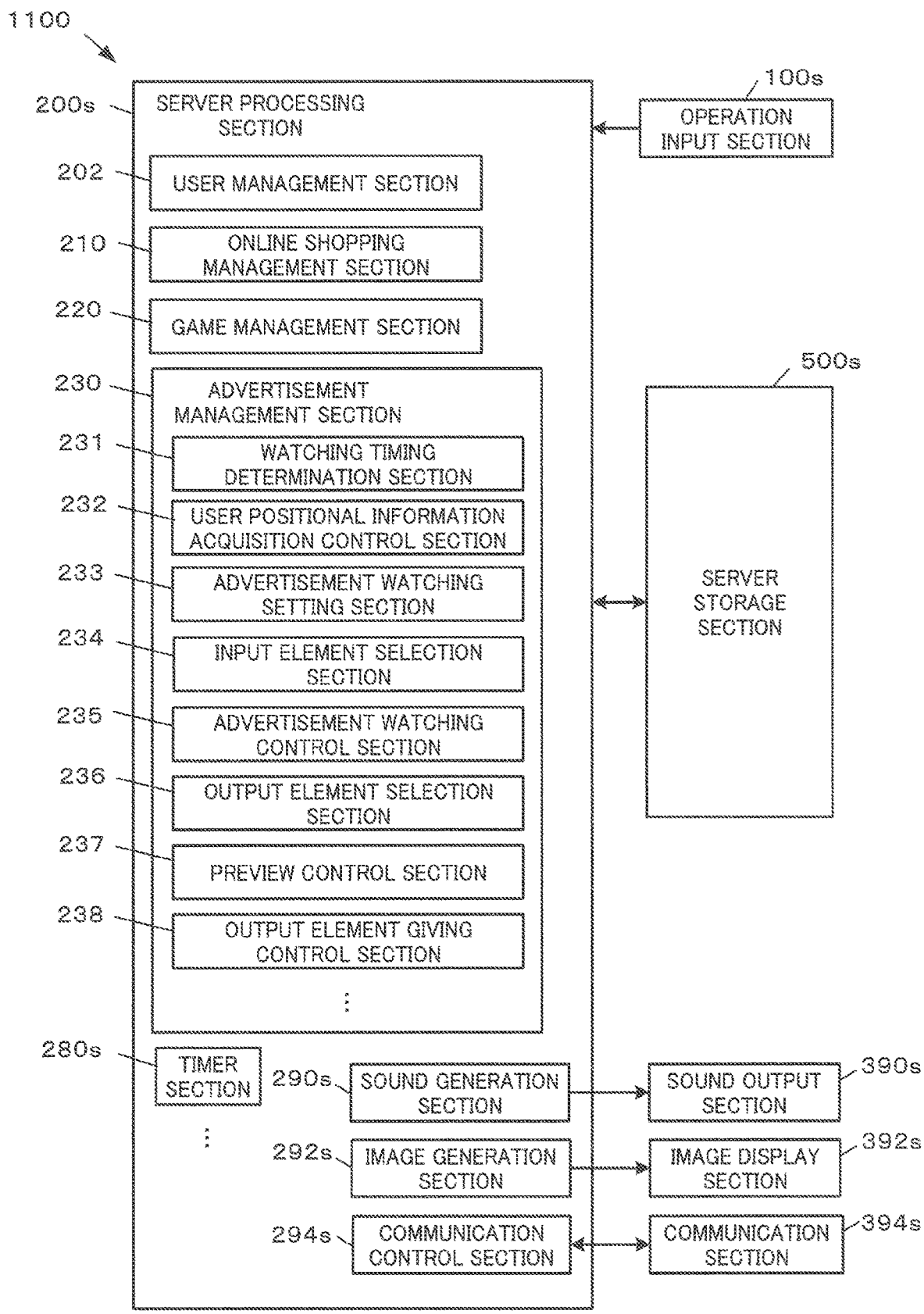
FIG. 7 is a functional block diagram illustrating an example of a functional configuration of a server system according to a first embodiment.

FIG. 7 is a functional block diagram illustrating an example of the functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for management. The operation input section 100s corresponds to the keyboard 1106 in FIG. 1.

The server processing section 200s is implemented with electronic parts such as a processor (e.g., a CPU and a GPU), an ASIC, and an IC memory. The server processing section 200s controls data exchanged between functional sections including the operation input section 100s and the server storage section 500s, and performs various types of calculation processes based on a predetermined program, data, operation input signals from the operation input section 100s, data revived from the user terminal 1500, and the like to entirely control the operation of the server system 1100.

The server processing section 200s according to the present embodiment includes a user management section 202, an online shopping management section 210, a game management section 220, an advertisement management section 230, a timer section 280s, a sound generation section 290s, an image generation section 292s, and a communication control section 294s. Note that other functional sections other than these may be included as appropriate.

The user management section 202 performs a process related to a user registration procedure and manages the data of each user associated with an account (user ID). In the present embodiment, the user management section 202 has various functions including: 1) issuing an account to a registered user; 2) registration information management for registering and managing personal information for each account; 3) book keeping management for a payment medium consumed for paying for a charged element related to the game (for example, the gameplay, charged lottery, online shopping, and the like); and 4) play history management for managing login/logout history. Note that any other appropriate management function for other data associated with the account can be included.

The online shopping management section 210 is in charge of control related to the online shopping that is one of the charged elements, and can be implemented with a known online shopping technique as appropriate. In the present embodiment, the player can purchase items, an executable lottery ticket, an event participation ticket, and the like through online shopping. Any other elements may be set as appropriate to be sold in the online shopping. The online shopping management section 210 is in charge of performing a process for giving the bonus point.

The game management section 220 performs various processes related to gameplay management. The game according to the present embodiment is a client-server online game, and thus the game management section 220 communicates with the user terminal 1500 to perform control for providing data required for the gameplay.

The advertisement management section 230 manages data on an advertisement, and performs output control for implementing advertisement watching, and control for item conversion in return for the advertisement watching. Specifically, the advertisement management section 230 according to the present embodiment includes a watching timing determination section 231, a user positional information acquisition control section 232, an advertisement watching setting section 233, an input element selection section 234, an advertisement watching control section 235, an output element selection section 236, a preview control section 237, an output element giving control section 238. Note that functional sections other than these may be included as appropriate.

The watching timing determination section 231 determines a timing at which the advertisement watching is possible.

The user positional information acquisition control section 232 performs control for acquiring the user positional information from the user terminal 1500. In the present embodiment, the user positional information and a request for the item conversion setting are acquired from the user terminal 1500, when the second confirmation operation icon 24 is selected and operated on the advertisement offer screen W3 (see FIG. 5). Alternatively, the user terminal 1500 may be requested to transmit the user positional information, when the request is received. Furthermore, a configuration may be employed where the user terminal 1500 periodically transmits the user positional information to the server system 1100, and the server system 1100 records and manages the user positional information in association with an account of the user. In such a configuration, the user positional information thus recorded and managed may be simply referred to.

The advertisement watching setting section 233 performs various watching settings including selecting an advertisement to be the target of the advertisement watching. In the present embodiment, at least one of a plurality of advertisements prepared is selected as the watching target, and the "watching setting" may be performed to set the output mode, the display size, the displayed position, and the like in accordance with the watching target advertisement.

The "watching setting" includes an output mode of the watching target advertisement and watching target advertisement output time setting (for example, required watching time). In the present embodiment, copies of the output mode and the time setting set in advance to an advertisement selected as the watching target advertisement by the advertisement watching setting section 233 are used. The "watching setting" includes timing setting including at least one of a timing in the game at which the watching target advertisement is output, date and time at which the watching target advertisement is output, and a time zone in which the watching target advertisement is output.

The input element selection section 234 selects an input element from the entertainment elements, related to the game, possessed by the user (player). In other words, the input element is selected from a plurality of pieces of disposable information possessed by the user. In the present embodiment, 1) automatic search for the input element option, 2) control for displaying the advertisement offer screen W3 (see FIG. 5) on the user terminal 1500, 3) control for automatically setting one of the input elements options to be the input element as initial setting, and 4) control for setting the input element in accordance with the operation for setting the input element. Furthermore, the input element selection section 234 selects the input element from the entertainment elements with a valid period of the element to be selectable as the input element not expired yet, by referring to the valid periods associated with the entertainment elements.

The advertisement watching control section 235 performs advertisement watching control for converting an input element into an entertainment element different from the input element (that is, disposable information different from the input element) to be an output element to be given to the user serving as the player, in return for watching an advertisement.

The output element selection section 236 selects the output element based on the watching target advertisement and the watching setting. In the present embodiment, the output element is selected based on any one of 1) advertisement information on a watching target advertisement that is an advertisement serving as a target of the output control (watching target), 2) watching setting information related to watching control, 3) input element information that is information related to the input element, 4) compatibility determined between the watching target advertisement and the input element, and 5) positional relationship between positional information set to the watching target advertisement and user positional information.

The preview control section 237 shows a preview of the output element to be given when watching control for the advertisement is completed, before the watching control is completed. In the present embodiment, the preview control section 237 corresponds to display control for the preview section 35 in the setting screen W4 (see FIG. 6).

The output element giving control section 238 performs control so that the output element, in place of the input element, is given to the user serving as the player, when the watching control is completed.

The timer section 280s uses a system clock to obtain the current date and time, a time limit, and the like.

The sound generation section 290s is implemented with an integrated circuit (IC) or by executing software that generates sound data and performs decoding, and generates or decodes sound data on a sound related to system management for the server system 1100 or related to the gameplay, background music (BGM), and a character voice. The resultant sound signal related to the system management is output to the sound output section 390s.

The sound output section 390s receives the sound signal to emit the corresponding sound, and corresponds to a speaker (not illustrated) of the main body device 1101 or the touch panel 1108 in the example illustrated in FIG. 1.

The image generation section 292s can generate an image related to the system management for the server system 1100, a game image (or data for displaying the game image on the user terminal 1500), and the like. The image related to the system management can be output to the image display section 392s.

The image display section 392s displays various images for system management based on the image signals input from the image generation section 292s. For example, the image display section 392s may be implemented with an image display device such as a flat panel display, a cathode-ray tube (CRT), a projector, or a head-mounted display. The image display section 392s corresponds to the touch panel 1108 in the example illustrated in FIG. 1.

The communication control section 294s performs a data process related to the data communications, and exchanges data with an external device through the communication section 394s. In the present embodiment, a process related to the data communications with the user terminal 1500 is performed.

The communication section 394s connects to the communication line 9 to implement communications. The communication section 394s is implemented with a transceiver, a modem, a terminal adapter (TA), a jack for a communication cable, a control circuit, and the like. The communication section 394s corresponds to the communication device 1153 in the example illustrated in FIG. 1.

The server storage section 500s stores a program and various types of data for implementing various function of the server processing section 200s for entirely controlling the server system 1100. The server storage section 500s is used as a work area for the server processing section 200s, and temporarily stores the results of calculations performed by the server processing section 200s based on various programs. The function of the server storage section 500s is implemented with an IC memory (e.g., RAM and ROM), a magnetic disk (e.g., hard disk), an optical disk (e.g., CD-ROM and DVD), an online storage, or the like. The server storage section 500s corresponds to a storage medium such as the IC memory 1152 and hard disk mounted in the main body device 1101 and the storage 1140 in the example illustrated in FIG. 1.

Figure 8:
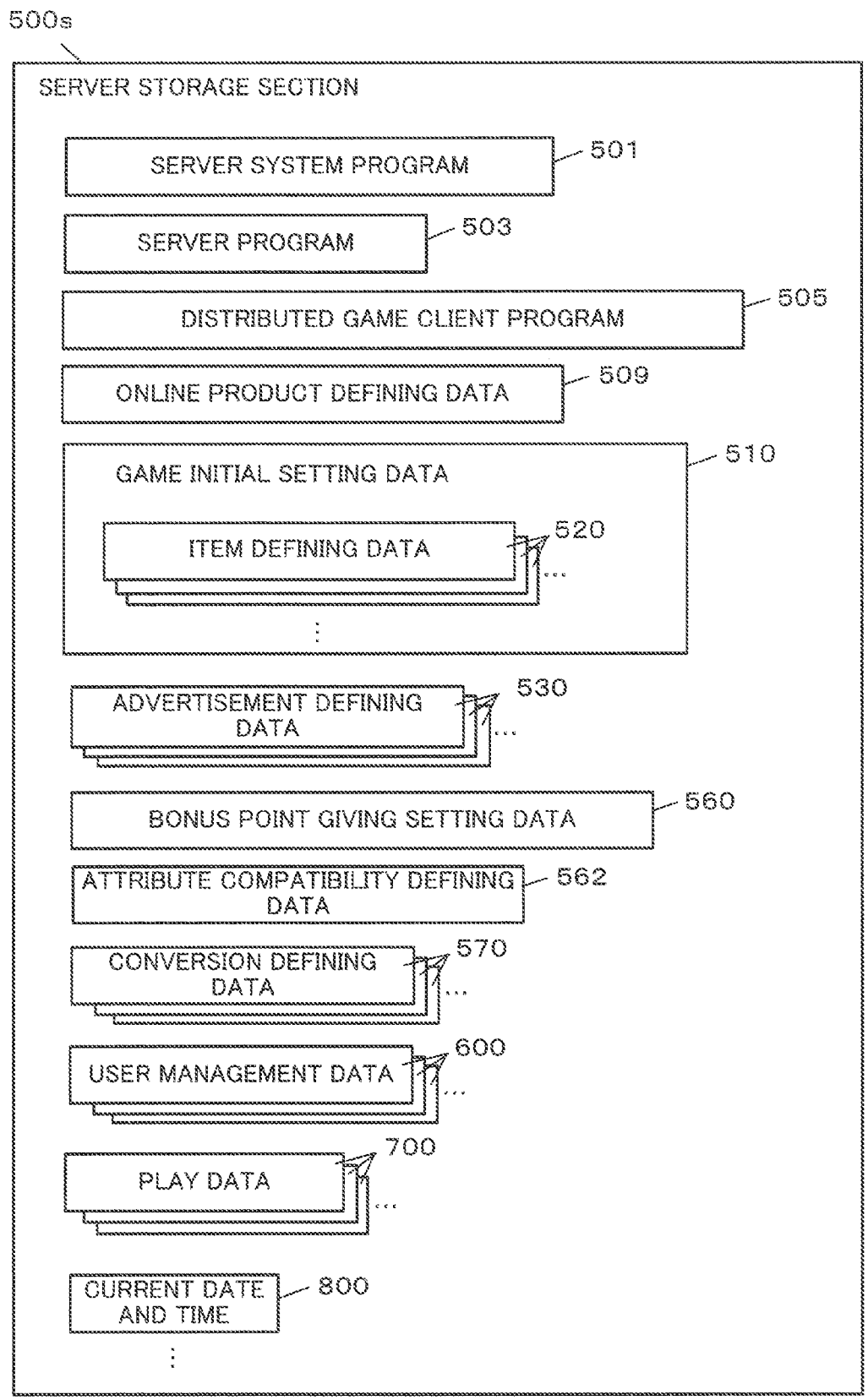
FIG. 8 is a diagram illustrating an example of a program and data stored in a server storage section according to the first embodiment.

FIG. 8 is a diagram illustrating an example of a program and data stored in the server storage section 500s according to the present embodiment. The server storage section 500s stores therein in advance, a server system program 501, a server program 503, a distributed game client program 505, an online product defining data 509, a game initial setting data 510, an advertisement defining data 530, a bonus point giving setting data 560, an attribute compatibility defining data 562, and a conversion defining data 570.

The server storage section 500s stores data, sequentially generated and managed, including user management data 600, play data 700, and current date and time 800. Furthermore, the server storage section 500s may store information on a timer, a counter, various flags, and the like as appropriate.

The server system program 501 is read out and executed by the server processing section 200s for causing the server system 1100 to implement a basic input/output function required for a computer.

The server program 503 is read out and executed by the sever processing section 200s for implementing functions of the user management section 202, the online shopping management section 210, the game management section 220, and the advertisement management section 230 (see FIG. 7).

The distributed game client program 505 is an original of a game client program provided to the user terminal 1500.

The online product defining data 509 is data defining a product purchasable through the online shopping implemented with the online shopping management section 210 (see FIG. 7). One online product defining data 509 includes a unique product type (for example, an item type or the like), a purchasing cost, a quantity given, and a product category associated with each other. It is a matter of course that information other than these may be included as appropriate.

The game initial setting data 510 includes various types of initial setting data, defining data, and the like for executing the game according to the present embodiment. In the present embodiment, the game initial setting data 510 includes item defining data 520.

Figure 9:
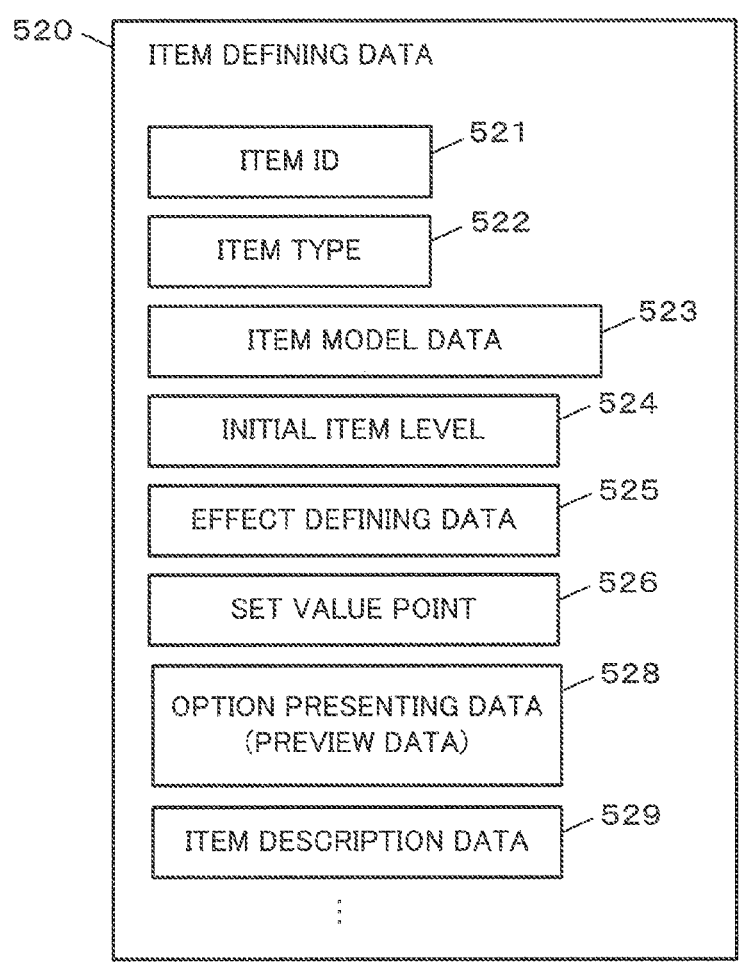
FIG. 9 is a diagram illustrating an example of a data structure of item defining data.

The item defining data 520 is prepared for each type of item, and includes various types of defining data related to the item. For example, as illustrated FIG. 9, one item defining data 520 includes an item ID 521 that is unique identification information on the item, an item type 522, an item model data 523 for depicting the item in the game, an initial item level 524 indicating an initial status of the item, effect defining data 525 defining the effect of the item, a set value point 526 of the item, option presenting data 528 for presenting the item on the input element option presenting section 30 on the setting screen W4 (see FIG. 6) or displaying the preview section 35, and item description data 529 for displaying information indicating that the item is set as the input element and description on the input element on the input element description section 31. Note that data other than these can be included as appropriate.

Figure 10:
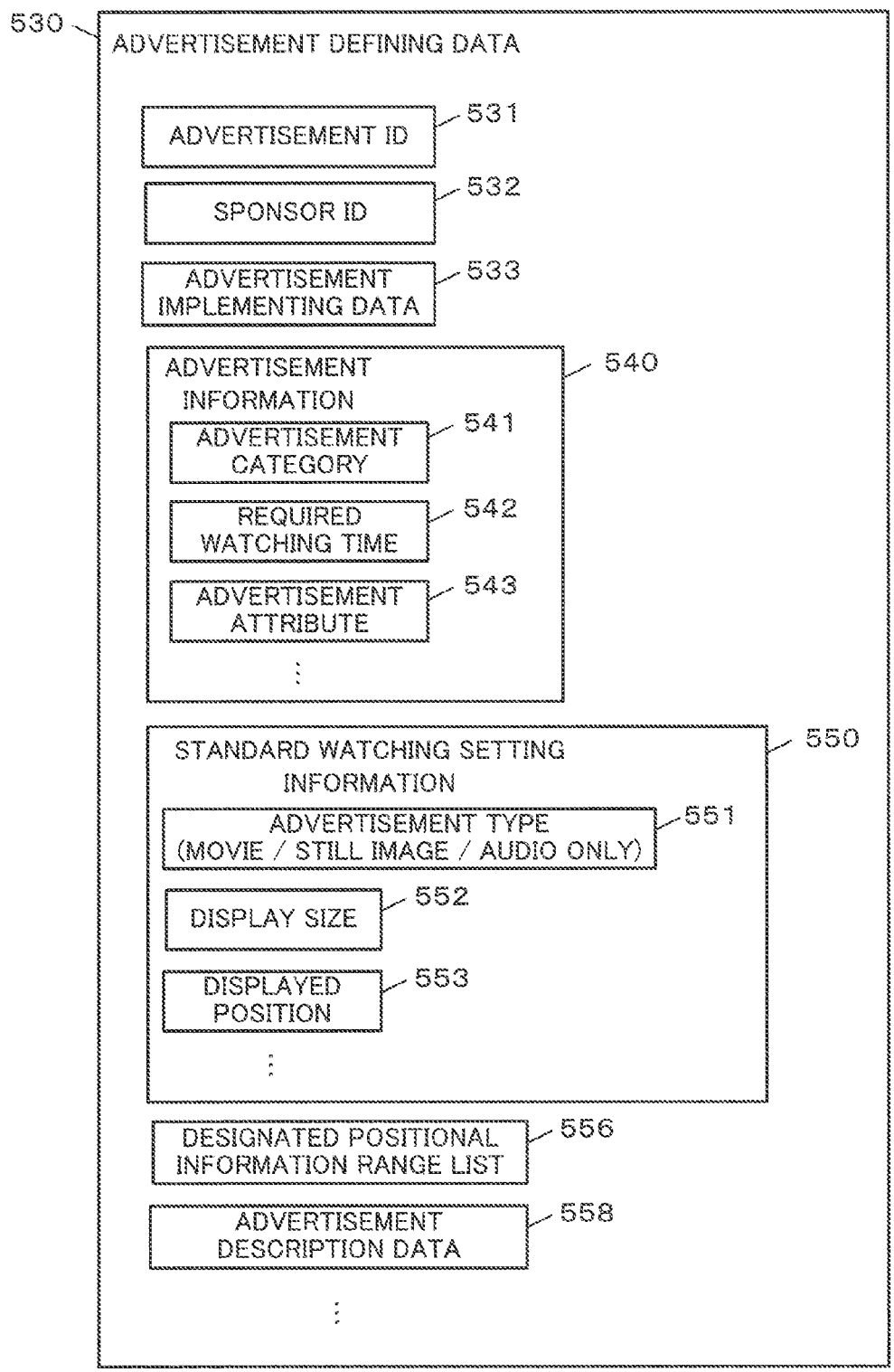
FIG. 10 is a diagram illustrating an example of a data structure of advertisement defining data.

Referring back to FIG. 8, the advertisement defining data 530 is prepared for each advertisement. For example, as illustrated in FIG. 10, one advertisement defining data 530 includes an advertisement ID 531 serving as unique identification information on the advertisement, a sponsor ID 532 for identifying the sponsor of the advertisement, advertisement implementing data 533 as an entity for implementing the advertisement watching, advertisement information 540, standard watching setting information 550, designated positional information range list 556, and advertisement description data 558.

The advertisement implementing data 533 may be movie data still image data, and sound data, and thus is not limited to any particular data format.

The advertisement information 540 is additional information related to the advertisement. In the present embodiment, the advertisement information 540 includes an advertisement category 541 based on the content of the advertisement, required watching time 542, and a given advertisement attribute 543. Note that data other than these can be included as appropriate. The type of the advertisement attribute 543 can be set as appropriate. and may be set to be three attributes including "fire", "water", and "wood", for example.

The standard watching setting information 550 includes a setting value for a standard setting watching environment for watching the advertisement. In the present embodiment, the standard watching setting information 550 includes an advertisement type 551 that is any one of a movie, a still image, and audio only, a display size 552, and a displayed position 553. Note that data other than these can be included as appropriate.

The designated positional information range list 556 is data defining a geographic condition associated with the advertisement, and is compared with a coordinate system of the user positional information acquired by the position measurement module 1555 of the user terminal 1500. Specifically, one or a plurality of ranges of GPS coordinates are set. Note that this information may not be set.

The advertisement description data 558 includes an image, a text, sound data, or the like for describing an overview of the advertisement corresponding to the defining data. In the present embodiment, the advertisement description data 558 is used for displaying the to-be-watched advertisement description section 21 on the advertisement offer screen W3 (see FIG. 5) and the setting screen W4 (see FIG. 6) or for the other like purposes.

Referring back to FIG. 8, the bonus point giving setting data 560 is data in which a condition for giving the bonus point and an amount of the point thus given is defined in association with each other. For example, one or a plurality of sets of data pieces are stored, with each set including two types of data which are the giving condition "bulk purchase, quantity: 5, online shopping" and the given point amount "5 points". Note that this information may not be set.

The attribute compatibility defining data 562 is data defining the type of the item that can be the input element and compatibility relative to the advertisement attribute. The type of the compatibility may be set as appropriate, and may include "no compatibility".

The conversion defining data 570 is data defining a pattern of conversion from the input element to the output element. In the present embodiment two types of the "point giving type" and the "barter type" are available.

Figure 11:
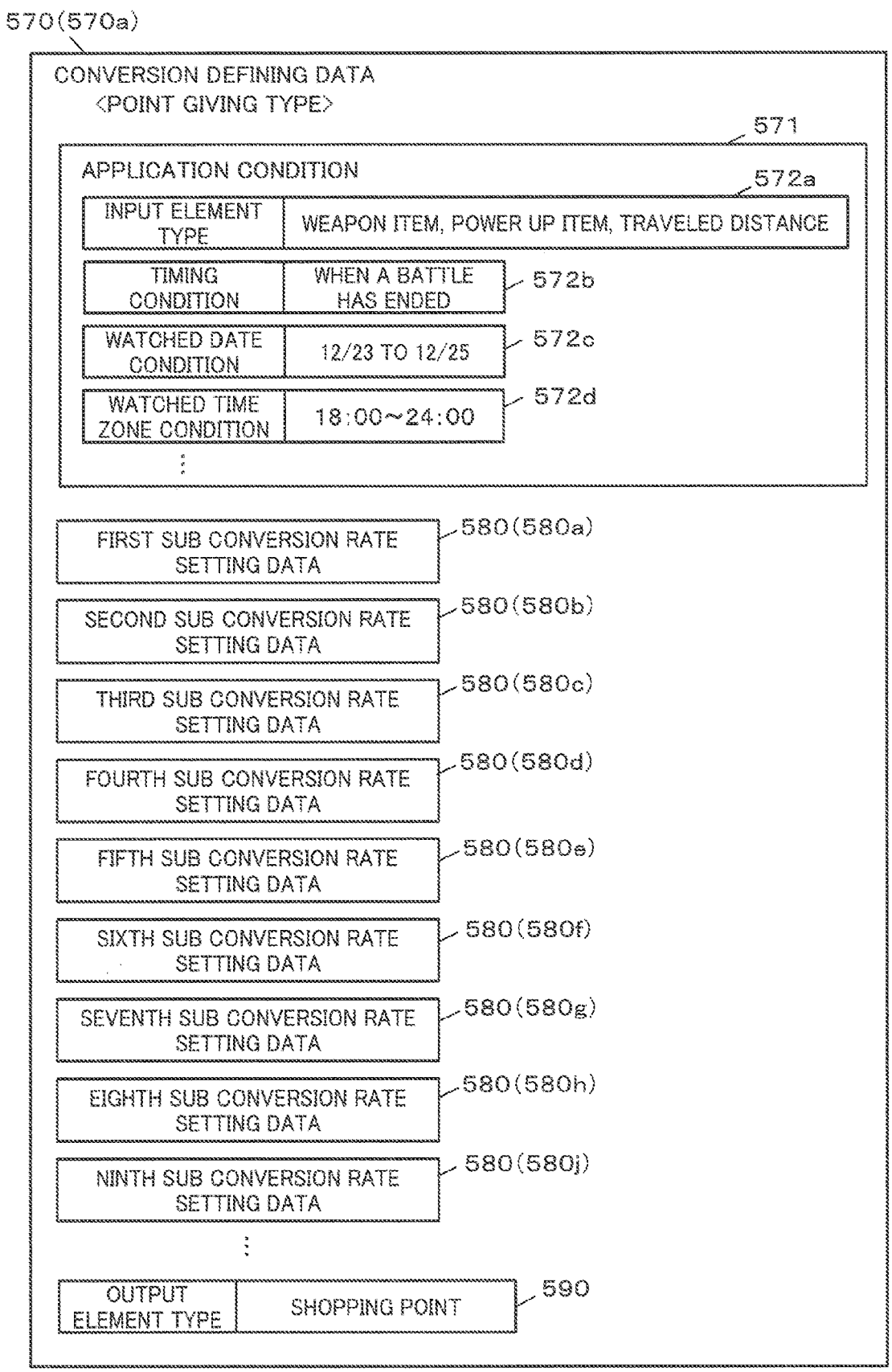
FIG. 11 is a first diagram illustrating an example of a data structure of conversion defining data.

The conversion defining data 570 for the "point giving type" includes an application condition 571, a plurality of pieces of sub conversion rate setting data 580 (580a, 580b, . . . ), and an output element type 590 as illustrated in FIG. 11 for example. Note that data other than these can be included as appropriate.

The application condition 571 defines a requirement for applying the conversion defining data 570. In the present embodiment the condition includes an input element type 572a, a timing condition 572b, a watched date condition 572c that is a condition related to a date on which an advertisement is watched, and a watched time zone condition 572d that is a condition related to a time zone in which an advertisement is watched.

The input element type 572a is a list of types of the input elements. The types of at least one of the entertainment element and the disposable information, usable as the input element, are set.

The timing condition 572b is a condition defining a situation of outputting an advertisement after the game has started. Options may be set as appropriate. The game according to the present embodiment is an ARPG. Thus, for example, such a timing, during the gameplay, is preferably set to be during a movement within a map, while data on the next map is being loaded, when entering a dungeon from the map, when a battle has ended, when a stage is finished, and the like. Such a timing, before the gameplay, is preferably set to be while a menu is being displayed, while data is being loaded, during online shipping, and the like. Such a timing, after the gameplay, may be set to be while checking the result, while checking the ranking, and the like. Note that the condition may include "not set". In the timing condition 572b, one or a plurality of the timings described above are set.

Note that the application condition 571 may include other types of data as appropriate. For example, the age of the player, the gender of the player, a user registration date, and the like can be used as appropriate.

In the example illustrated in FIG. 11, a type of the point is designated in the output element type 590. FIG. 11 illustrates an example where the type of the point is a shopping point usable in online shopping. Note that a bonus point, a membership point usable outside the game, a credit card point, or the like may be set as appropriate.

The sub conversion rate setting data 580 (580a, 580b, . . . ) is prepared for each sub conversion rate for calculating a conversion rate. In the present embodiment, the conversion rate for converting the input element into the corresponding set value point 526 (see FIG. 9) is obtained as a product of all of a plurality of plurality of sub conversion rates determined based on pieces of the sub conversion rate setting data 580 (580a, 580b, . . . ). The conversion rate may also be obtained as a sum of the sub conversion rates.

FIG. 12 is a diagram illustrating an example of first sub conversion rate setting data 580a. The first sub conversion rate setting data 580a includes a list of advertisement IDs indicating predetermined advertisements, serving as a selection condition 581 associated with a first sub conversion rate 583a. The first sub conversion rate setting data 580a enables a certain predetermined advertisement to be set to have a higher or lower conversion rate than other advertisements.

FIG. 13 is a diagram illustrating an example of second sub conversion rate setting data 580b. The second sub conversion rate setting data 580b includes a list of sponsors of predetermined advertisements, serving as the selection condition 581 associated with a second sub conversion rate 583b. The second sub conversion rate setting data 580b enables an advertisement with a certain predetermined advertisement sponsor to be set to have a higher or lower conversion rate than other advertisements.

FIG. 14 is a diagram illustrating an example of third sub conversion rate setting data 580c. The third sub conversion rate setting data 580c includes an advertisement category serving as the selection condition 581 associated with a third sub conversion rate 583c. The third sub conversion rate setting data 580c enables an advertisement with a certain predetermined content to be set to have a higher or lower conversion rate than other advertisements.

FIG. 15 is a diagram illustrating an example of fourth sub conversion rate setting data 580d. The fourth sub conversion rate setting data 580d includes the watching setting information (in the present embodiment, a combination of the advertisement type, the required watching time, and the display size, that is, advertisement watching environment setting and output mode) serving as the selection condition 581 associated with a fourth sub conversion rate 583d. The fourth sub conversion rate setting data 580d enables a conversion rate to be set to be high and low based on the watching setting information which is a combination of the advertisement type, the required watching time, and the display size. The watching setting information may include items other than these such as a displayed position as appropriate.

Any one of the condition elements (three elements in the present embodiment include the advertisement type, the required watching time, and the display size) serving as the selection condition 581 in the fourth sub conversion rate setting data 580d may be set to be "not set". For example, the selection condition 581 "still image/90 seconds" in the figure does not have the condition for the display size set, meaning that any display size can be employed. The conversion rate is set to be lower to satisfy the relationship movie>still image>audio only regarding the advertisement type, to be lower for a shorter required watching time, and to be lower for a smaller display size. Note that this relationship may be reversed.

FIG. 16 is a diagram illustrating an example fifth sub conversion rate setting data 580e. The fifth sub conversion rate setting data 580e includes compatibility, between an attribute of the input element and an attribute of an advertisement, serving as the selection condition 581 associated with a fifth sub conversion rate 583e. The fifth sub conversion rate setting data 580e enables the conversion rate to be set to be higher or lower based on the compatibility between the attribute of the input element and the attribute of the advertisement.

FIG. 17 is a diagram illustrating an example of sixth sub conversion rate setting data 580f. The sixth sub conversion rate setting data 580f includes the quantity of the entertainment element or the disposable information, set to be the input element, possessed by the player, serving as the selection condition 581 associated with a sixth sub conversion rate 583f. The sixth sub conversion rate setting data 580f enables the conversion rate to be set to be higher or lower based on the importance of the entertainment element or the disposable information, set to be the input element, to the player.

FIG. 18 is a diagram illustrating an example of seventh sub conversion rate setting data 580g. The seventh sub conversion rate setting data 580g includes information on a status of the entertainment element or the disposable information, set to be the input element, that is, an item level in the present embodiment serving as the selection condition 581 associated with a seventh sub conversion rate 583g. The seventh sub conversion rate setting data 580g enables the conversion rate to be set to be higher or lower in accordance with the item level.

FIG. 19 is a diagram illustrating an example of eighth sub conversion rate setting data 580h. The eighth sub conversion rate setting data 580h includes the input quantity of the input element serving as the selection condition 581 associated with a eighth sub conversion rate 583h. The eighth sub conversion rate setting data 580h enables the conversion rate to be set to be higher or lower in accordance with the input quantity of the input element. In the present embodiment, a larger input quantity directly relates to a higher rate. However, this relationship can be reversed.

FIG. 20 is a diagram illustrating an example of ninth sub conversion rate setting data 580j. The ninth sub conversion rate setting data 580j includes relationship between positional information associated with the watching target advertisement (a designated positional information range list 556 (see FIG. 10)) and a position of the player, serving as the selection condition 581 associated with a ninth sub conversion rate 583j. The ninth sub conversion rate setting data 580j enables the conversion rate to be set to be higher or lower in accordance with the relationship between the location related to the watching target advertisement and the current position of the player. In the present embodiment, the rate is set to be higher for closer positions. However, this relationship can be reversed.

In the example described in the present embodiment, nine pieces of sub conversion rate setting data 580 (580a, 580b, . . . ) are employed. Note that some of these may be omitted as appropriate, or a sub conversion rate may further be provided. For example, the timing condition 572b, the watched date condition 572c, and the watched time zone condition 572d may be omitted from the application condition 571 (see FIG. 11). A sub conversion rate setting data 580 with a sub conversion rate set with these conditions serving as the selection condition 581 may be additionally provided. The conversion defining data 570 may include a status where one or a plurality of pieces of sub conversion rate setting data 580 are technically "not set".

In FIG. 21, the conversion defining data 570 for the "barter type" includes the application condition 571, the output element type 590, and the output element quantity 592. Thus, it is defined that the output element of the output element type 590 is given to the player in an amount corresponding to the output element quantity 592, when the application condition 571 is satisfied.

The application condition 571 in the conversion defining data 570 for the "barter type" includes an input element type 572a, a timing condition 572b, a watched date condition 572c, a watched time zone condition 572d, a preview ID condition 572e, a sponsor condition 572f, a category condition 572g, a watching setting condition 572h, an attribute compatibility condition 572j, possessed quantity condition 572k, a level condition 572m, an input quantity condition 572n, and a position condition 572p. Note that data other than these can be included as appropriate. The preview ID condition 572e to the position condition 572p corresponds to the selection conditions 581 in the pieces of the sub conversion rate setting data 580 in the conversion defining data 570a for the "point giving type".

The types of the entertainment element/disposable information to be the output element is set to the output element type 590.

The quantity of the output element, of the output element type 590, to be given is set to the output element quantity 592.

A plurality of sets of the output element type 590 and the output element quantity 592 may be prepared, and may be selected randomly or by the player each time.

The output element quantity 592 may be calculated each time using a function with a parameter value related to the game progress control and a past charging history serving as a variable.

Referring back to FIG. 8, the user management data 600 is prepared for each registered user, that is, for each player, and includes various types of data associated with the user account. In other words, the user management data 600 is first play information on a player related to a game.

Figure 22:
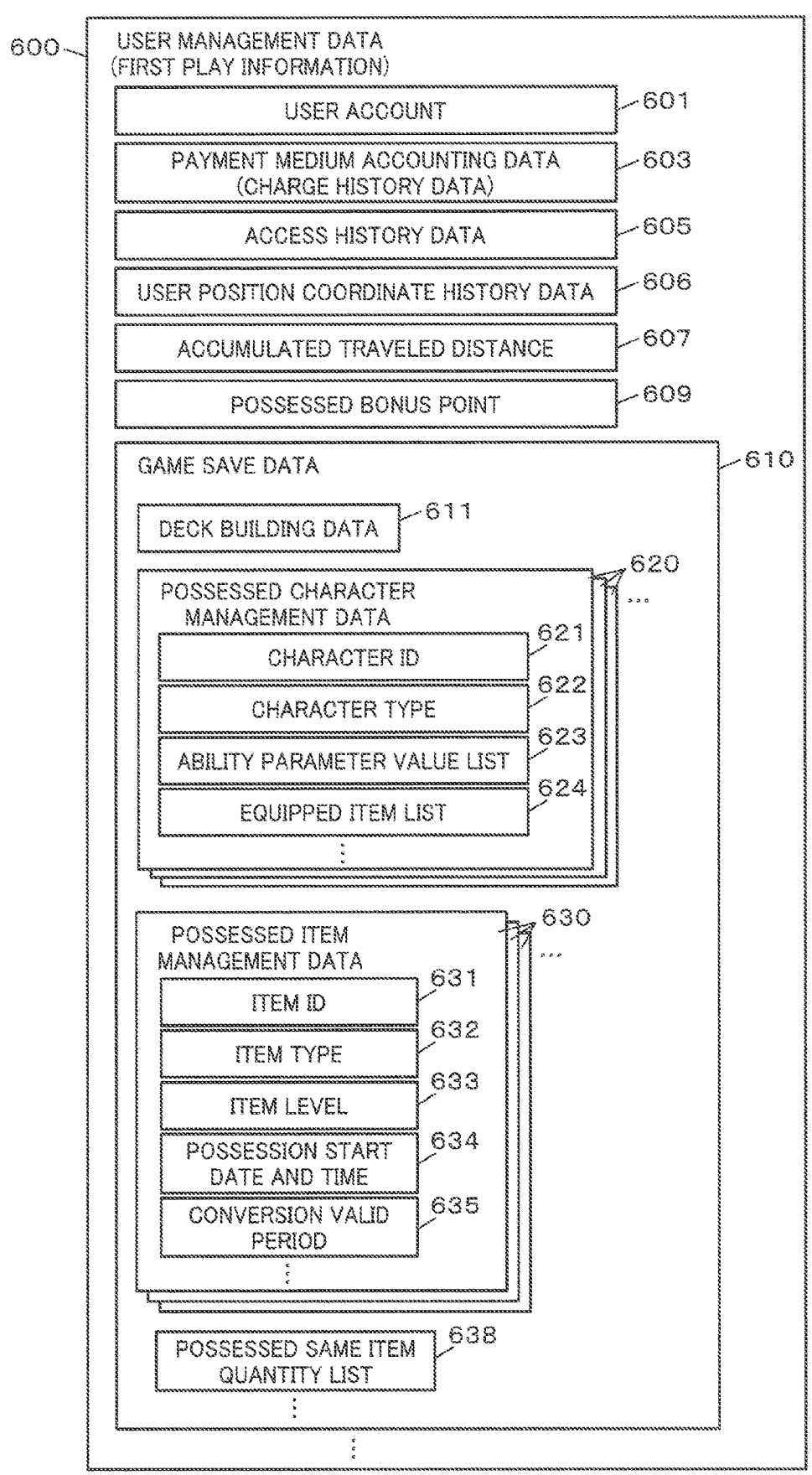
FIG. 22 is a diagram illustrating an example of a data structure of user management data.

For example, as illustrated in FIG. 22, one user management data 600 includes a unique user account 601, payment medium accounting data 603, access history data 605, user position coordinate history data 606, an accumulated traveled distance 607, a possessed bonus point 609, and game save data 610. Note that data other than these can be included as appropriate.

The payment medium accounting data 603 serves as what is known as an account book storing therein information on a charged/consumed amount of the payment medium associated with the user, information on a reason for the charging/consumption, and information on changed date and time in association with each other. The payment medium accounting data 603 can also be referred to as charge history data or charge information.

The access history data 605 is data in which the past game played timings are stored in series, and is automatically updated at a login/logout timing.

The user position coordinate history data 606 is a history of user positional coordinates. In the present embodiment, the data is updated with the user positional information automatically acquired at any appropriate timing from the user terminal 1500.

The accumulated traveled distance 607 includes an accumulated distance traveled by the player holding the user terminal 1500 with at least a program for implementing the game activated. When the traveled distance is used and consumed for the power up and the like of a character, an item, and the like, the accumulated traveled distance 607 is decremented by an amount corresponding to the used/consumed amount.

The possessed bonus point 609 includes the amount of bonus points that have been obtained but not used by the player.

The game save data 610 includes various types of data indicating the game progress status at the previous gameplay. In the present embodiment, the data includes deck building data 611, possessed character management data 620, possessed item management data 630, and a possessed same item quantity list 638. Note that data other than these can be included as appropriate.

The deck building data 611 is data for defining a group of characters selected by the player for the gameplay, from the possessed characters.

The latest state of each of the characters possessed by the player is recoded and managed by the possessed character management data 620. One possessed character management data 620 includes a character ID 621 serving as unique identification information on the character, a character type 622, an ability parameter value list 623, and an equipped item list 624. Note that data other than these can be included as appropriate.

The possessed item management data 630 is prepared for each item possessed by the player. One possessed item management data 630 includes an item ID 631, an item type 632, an item level 633, possession start date and time 634, and a conversion valid period 635. Note that information other than these, such as information on a history of equipping by the character for example may be included as appropriate.

The conversion valid period 635 indicates a period in which the item can be set to be the input element to be converted. For example, in the present embodiment, the period is automatically managed to be set as a predetermined period after data updating. For example, the item level 633 may be improved with a date and time after two weeks from the possession start date and time 634 set to be the first conversion valid period 635. Alternatively, data on a history of equipping by the character may be provided to the possessed item management data 630. When the history data is updated, the conversion valid period 635 may be updated (extended) to be date and time after two weeks from the point where the history data is updated. The conversion valid period 635 may be set to be a predetermined value indicating "no expiration" or "indefinite".

The possessed same item quantity list 638 is a list of quantities of the possessed items with different item IDs 631 and with the same item type 632, and is automatically updated each time the items, obtained by the player, increases or decreases (obtained, consumed, abandoned, and the like).

Referring back to FIG. 8, the play data 700 is prepared for each player (in other words, each user terminal 1500) and includes various types of data describing a control status and the like of the game program according to the present embodiment. In other words, the play data 700 is second play information on the player related to the game, and serves as game implementation status management data.

Figure 23:
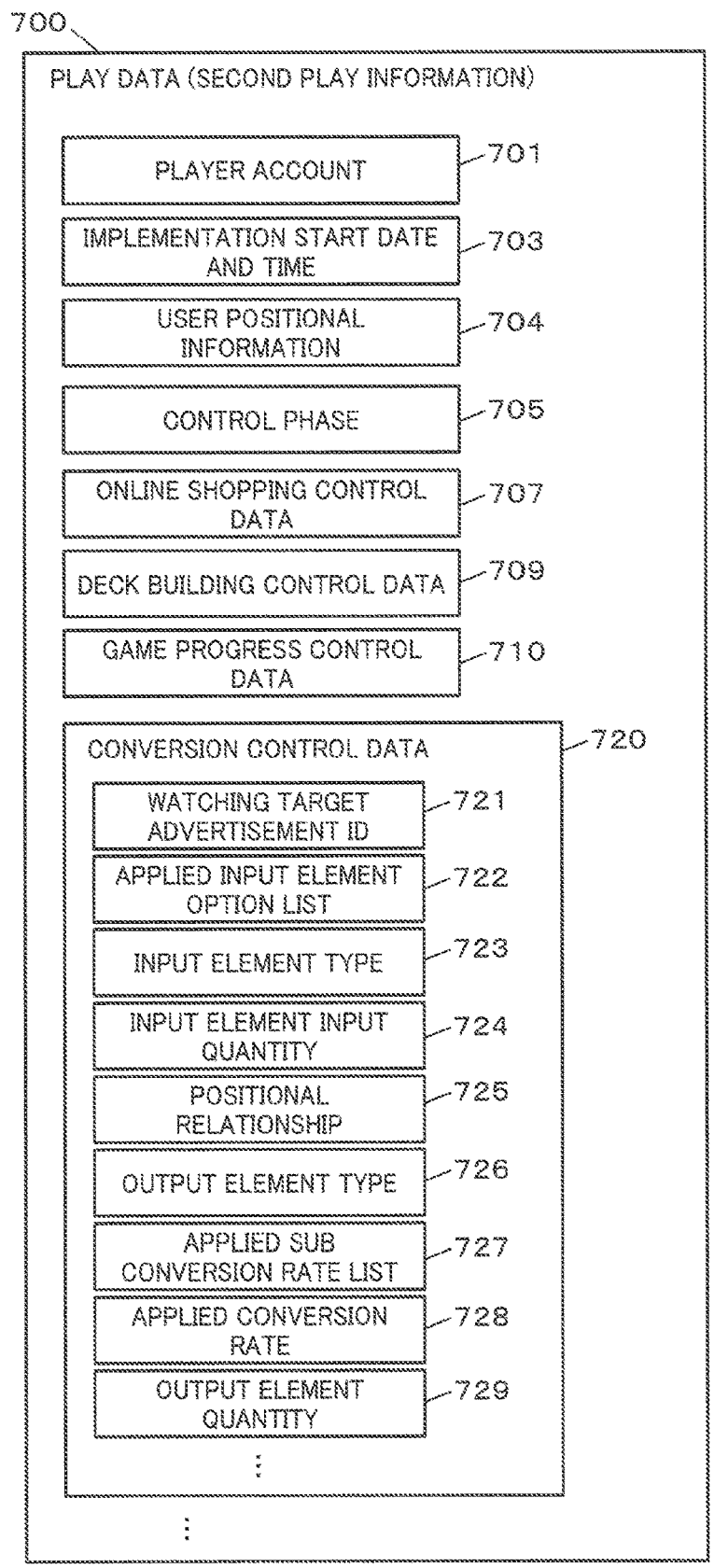
FIG. 23 is a diagram illustrating an example of a data structure of play data.

Specifically, one play data 700 includes a player account 701 including a user account of a player allocated with the data, implementation start date and time 703, user positional information 704, and a control phase 705 for example, as illustrated in FIG. 23.

The control phase 705 is information indicating rough categories of a game program control status (or control status). In the present embodiment, the phase is set to be any one of a display status of a menu displayed after login, during online shopping selected and implemented from the menu, during deck building selected and implemented from the displayed menu, during the gameplay selected and implemented from the menu, while result checking after the game is terminated or selected and implemented from the menu, and the like. Note that the category of the control phase is not limited to these, and other categories may be added, or any of those described above may be omitted as appropriate, in accordance with the content of the game or the system design.

The play data 700 has various types of control data appropriately generated/updated as appropriate, for storing specific control data for each control phase. In the present embodiment, the data includes online shopping control data 707, deck building control data 709, and game progress control data 710.

The game progress control data 710 includes various types of data describing that are generated when the gameplay starts and describe gameplay progress statuses. The content of the game progress control data 710 can be set as appropriate in accordance with the content of the game. For example, the data includes an ongoing progress unit indicating a game progress unit (for example, a stage, a scenario, a map, time in the game world, and the like) in the gameplay, a finished progress unit list including finished ones of the game progress units, an event occurrence history, information on a current position of each player character or enemy character in the game space, an ability parameter value list, and the like. Note that data other than these can be included as appropriate. For example, the name of a song in a played game, a game difficulty setting, and the like may be included as appropriate in accordance with the detail of the game.

The play data 700 includes conversion control data 720 related to the item conversion from the input element to the output element in return for the advertisement watching.

The conversion control data 720 according to the present embodiment includes a watching target ID 721 that is information for identifying the watching target, an applied input element option list 722, an input element type 723, an input element input quantity 724, positional relationship 725, an output element type 726, an applied sub conversion rate list 727, an applied conversion rate 728, and an output element quantity 729. Note that data other than these can be included as appropriate.

Figure 24:
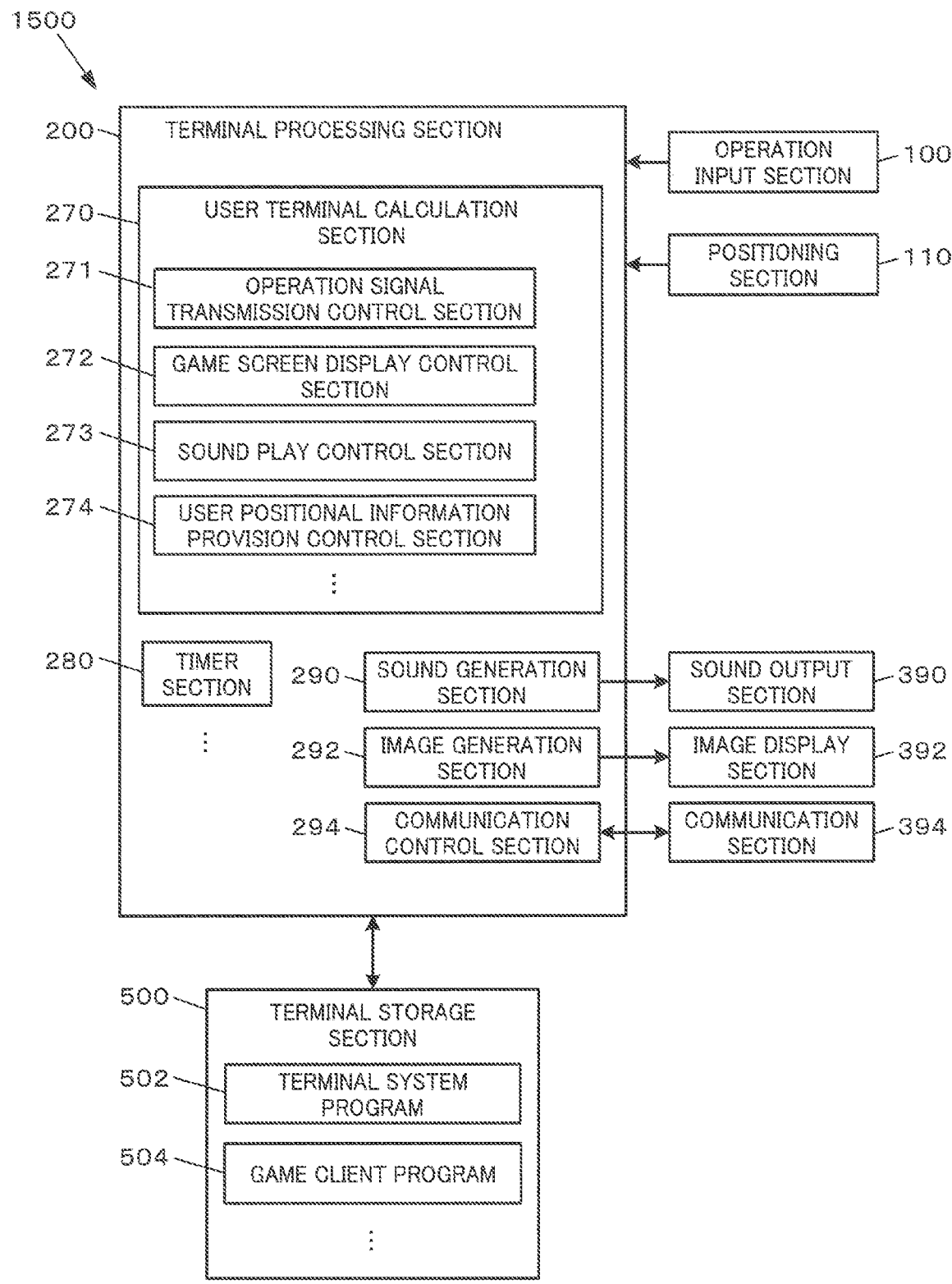
FIG. 24 is a functional block diagram illustrating an example of a functional configuration of a user terminal according to the first embodiment.

FIG. 24 is a functional block diagram illustrating an example of a functional configuration of the user terminal 1500 according to the present embodiment. The user terminal 1500 according to the present embodiment includes an operation input section 100, a positioning section 110, a terminal processing section 200, a sound output section 390, an image display section 392, a communication section 394, and a terminal storage section 500.

The operation input section 100 outputs an operation input signal, based on various operations input by the player, to the terminal processing section 200, and can be implemented with a push switch, a joystick, a touch pad, a track ball, an accelerometer, a gyro, a CCD module, or the like. The operation input section 100 corresponds to the arrow key 1502, the button switch 1504, and the touch panel 1506 in FIG. 1.

The positioning section 110 outputs user positional information to the terminal processing section 200. In the present embodiment, the positioning section 110 corresponds to the position measurement module 1555 in FIG. 1.

The terminal processing section 200 is implemented with electronic parts such as a processor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, user positional information from the positioning section 110, and various types of data received from the sever system 1100 to control the operation of the user terminal 1500. The terminal processing section 200 corresponds to the control board 1550 in FIG. 1. The terminal processing section 200 according to the present embodiment includes a user terminal calculation section 270, a timer section 280, a sound generation section 290, an image generation section 292, and a communication control section 294.

The user terminal calculation section 270 includes an operation signal transmission control section 271, a game screen display control section 272, a sound play control section 273, and a user positional information provision control section 274.

The operation signal transmission control section 271 performs a process of transmitting various types of data and a request to the server system 1100 in accordance with an operation on the operation input section 100.

The game screen display control section 272 performs control for displaying a game screen based on various types of data received from the server system 1100. In this configuration, the server system 1100 generates the image of the game screen. Alternatively, a configuration where the user terminal 1500 generates the image may also be employed. In this configuration, the game screen display control section 272 may be in charge of controlling an object disposed in a virtual three-dimensional space for generating a 3DCG for example.

The sound play control section 273 performs control to emit a sound (for example, sound effects, BGM, words read by a voice actor, and the like) based on various types of sound data received from the server system 1100.

The user positional information provision control section 274 executes control for providing user positional information to an external device. In the present embodiment, control for automatically transmitting the user positional information to the server system 1100 once in every predetermined interval may be performed, control for transmitting the user positional information when a predetermined request is transmitted to the server system 1100 may be performed, and control for transmitting the user positional information in response to a provision request from the server system 1100 may be performed.

The sound generation section 290 is implemented, for example, with a processor such as a DSP or a sound synthesizing IC, an audio codec for playing a sound file, or the like, and generates a sound signal for sound effects, BGM, various types of operation sound, words read by a voice actor, and the like related to the game, and outputs the signal thus generated to the sound output section 390.

The sound output section 390 is implemented with a device that outputs sound such as sound effects or BGM, based on the sound signal received from the sound generation section 290. The sound output section 390 corresponds to the speaker 1510 in FIG. 1.

The image generation section 292 is implemented, for example, with a processor (e.g., a GPU or a DSP), a video signal IC, a program (e.g., video codec), a drawing frame IC memory (e.g., frame buffer), and the like.

The image generation section 292 generates a game screen (image) every frame (e.g., 1/60th of a second) based on the various types of data received from the server system 1100, and outputs the image signal of the generated game screen to the image display section 392.

The image display section 392 displays various game images based on the image signals input from the image generation section 292. For example, the image display section 392 may be implemented with an image display device such as a flat panel display, a cathode-ray tube (CRT), a projector, or a head-mounted display. The image display section 392 corresponds to the touch panel 1506 illustrated in FIG. 1 in the present embodiment.

The communication control section 294 performs a data process for data communications, and exchanges data with an external device through the communication section 394. The communication section 394 connects to the communication line 9 to implement communications. For example, the communication section 394 is implemented with a transceiver, a modem, a TA, a jack for a communication cable, a control circuit, and the like, and corresponds to the wireless communication module 1553 in FIG. 1.

The terminal storage section 500 stores therein a system program for implementing various functions for causing the terminal processing section 200 to entirely control the user terminal 1500, a program and various types of data required for the gameplay, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented with an IC memory (e.g., RAM and ROM), a magnetic disk (e.g., hard disk), an optical disk (e.g., CD-ROM and DVD), or the like. The terminal storage section 500 corresponds to the IC memory 1552 and the memory card 1540 in the control board 1550 illustrated in FIG. 1.

The terminal storage section 500 according to the present embodiment stores therein a terminal system program 502 and a game client program 504. Note that other data, including data in which user positional information is stored in time series, can be included as appropriate.

The terminal system program 502 is a program for causing the user terminal 1500 to implement a basic input/output function of a computer.

The game client program 504 is application software that implements a function of the user terminal calculation section 270 when read and executed by the terminal processing section 200, and may be embedded as a part of the terminal system program 502. In the present embodiment, the game client program 504 is a copy of the distributed game client program 505 (see FIG. 8) provided from the sever system 1100.

The game client program 504 may be implemented with a dedicated client program or with a web browser program and a plugin that implements an interactive image display, depending on a technique and a method for implementing a game.

[Process]

Next, a process performed by the game system 1000 is described.

Figure 25:
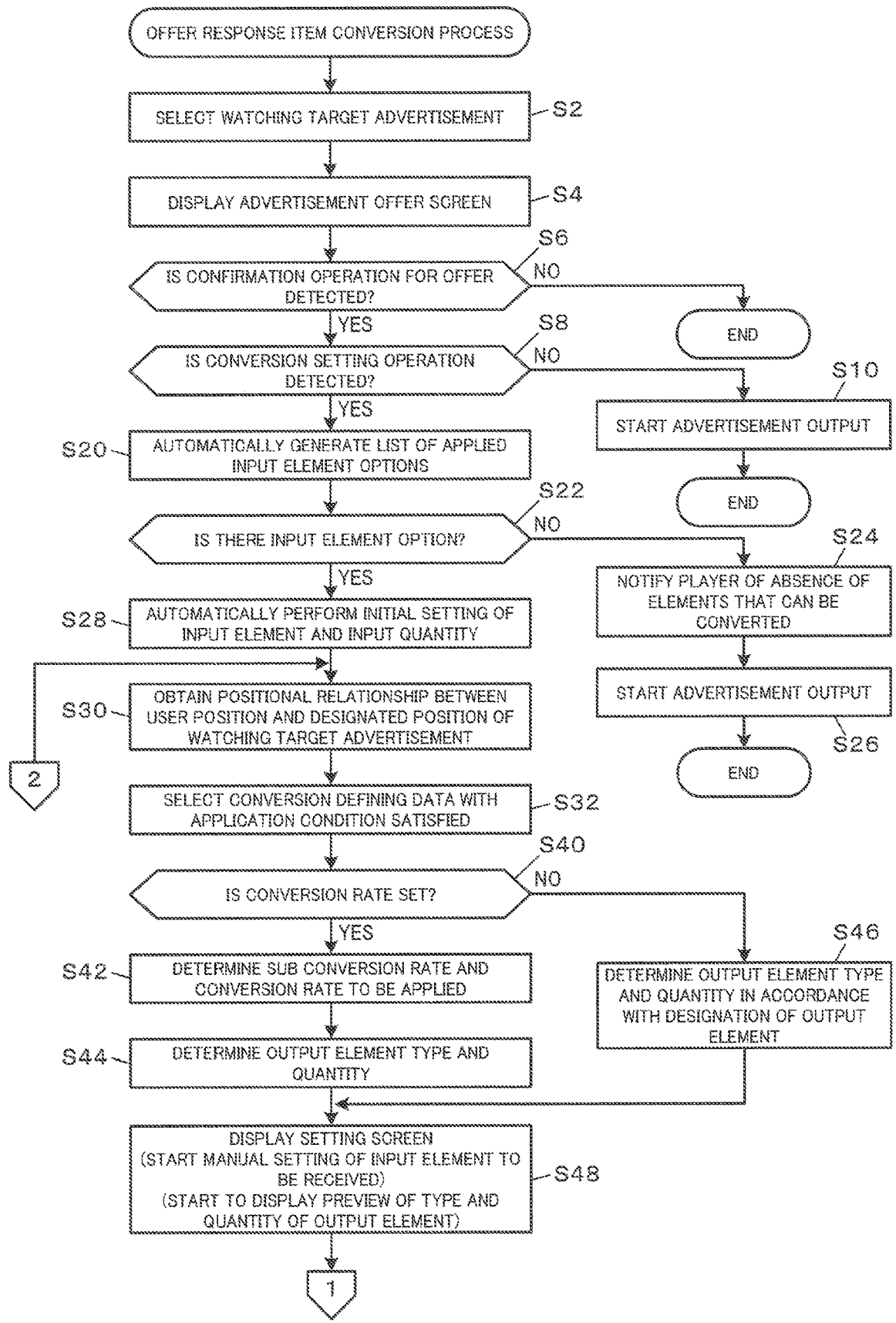
FIG. 25 is a flowchart illustrating a flow of an offer accepted item conversion process performed by the server system according to the first embodiment.
Figure 26:
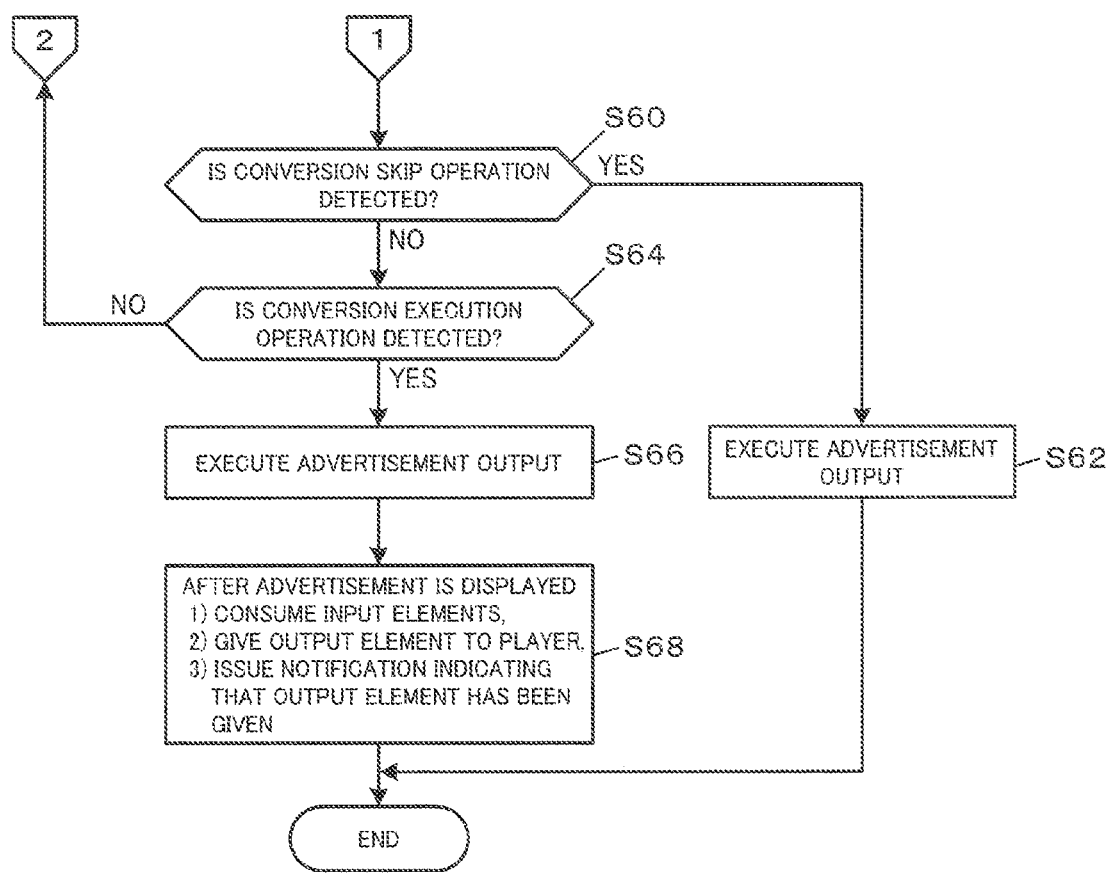
FIG. 26 is a flowchart continuing from FIG. 25.

FIG. 25 and FIG. 26 are each a flowchart illustrating a flow of the process performed by the server system 1100. Specifically, the flowcharts illustrate a series of processes representing a flow the conversion from the input element to the output element performed, in return for the advertisement watching, after the timing at which the predetermined advertisement watching is determined to have arrived. A flow of the process described herein is referred to as an "offer response item conversion process". The offer response item conversion process is implemented with the server processing section 200s executing the server program 503. In the user terminal 1500, a game program according to the present embodiment, that is, the game client program 504 is assumed to have been started to be executed with the gameplay start operation by the player and thus is assumed to have been booted.

The server system 1100 refers to the advertisement defining data 530 (see FIG. 8) to select one or a plurality of watching target advertisements, and set the watching target advertisement ID 721 in the conversion control data 720 (step S2). Then, the advertisement offer screen W3 (see FIG. 5) is displayed on the user terminal 1500 (step S4).

When the watching denial operation icon 22 or the screen delete operation icon 25 are operated on the advertisement offer screen W3 or not operation has been input for a predetermined period of time after the screen is started to be displayed, the server system 1100 determines that the advertisement offer is not confirmed (NO in step S6), and the process is terminated, the advertisement is not watched, and thus no item conversion is performed in return for the advertisement watching.

When the first confirmation operation icon 23 is operated on the advertisement offer screen W3, the server system 1100 determines that the advertisement offer is confirmed but the item conversion is not confirmed (NO in step S8), and performs the advertisement output control for outputting the watching target advertisement on the user terminal 1500 (step S10). Then, the process is terminated.

When the second confirmation operation icon 24 is operated on the advertisement offer screen W3, the server system 1100 determines that the advertisement offer is confirmed and that the conversion setting operation for the item conversion has been performed (YES in step S8). Then, a list of input element options is automatically generated (step S20).

Specifically, a list of entertainment elements/disposable information with the conversion valid period 635 (see FIG. 22) not expired yet is generated based on the user management data 600 (see FIG. 22) on the player. Then, the list is stored as the applied input element option list 722 in the conversion control data 720 (see FIG. 23).

When there is no input element option to be set to the applied input element option list 722 (NO in step S22), the server system 1100 causes the user terminal 1500 to notify the player of the absence of the possessed entertainment elements/disposable information that can be converted (step S24). Then the advertisement output control is executed (step S26), and the process is terminated.

When there is an input element option (YES in step S22), the server system 1100 makes initial setting to set any one of the input element options to be the input element, and makes initial setting to set the input quantity of this input element to "1" (step S28). These initial settings are stored in the base information 723 and the input element input quantity 724 in the conversion control data 720 (see FIG. 23).

Next, the server system 1100 obtains the relative positional relationship between the user position and the designated position of the watching target advertisement (step S30). Specifically, the user positional information provision request is transmitted to the user terminal 1500 to acquire the latest user positional information. Alternatively, the latest information is read out from the user position coordinate history data 606 in the user management data 600 and checked against the designated positional information range list 556 (see FIG. 10) of the watching target advertisement. Thus, the positional relationship 725 is determined.

Next, the server system 1100 selects one conversion defining data 570 with the application condition 571 (see FIG. 11 and FIG. 21) satisfied (step S32). When there are a plurality of pieces of setting data satisfying the application condition 571, the conversion defining data 570 for the point giving type is prioritized in the present embodiment. Note that the barter type may be prioritized, or one of the types may be randomly selected.

When the selected conversion defining data 570 has a conversion rate set, that is, when the selected data is setting data for the point giving type (YES in step S40), the server system 1100 determines the sub conversion rate and the conversion rate to be applied (step S42). Specifically, the server system 1100 refers to the first sub conversion rate setting data 580a to the ninth sub conversion rate setting data 580j (see FIG. 11) to obtain the first sub conversion rate 583a to the ninth sub conversion rate 583j, and stores the rates in the applied sub conversion rate list 727 in the conversion control data 720 (see FIG. 23). Then, the applied conversion rate 728 is set to be the product of all the sub conversion rate in the applied sub conversion rate list 727.

Then, the output element type 726 and the output element quantity 729 in the conversion control data 720 (see FIG. 23) are determined in accordance with the definition in the selected conversion defining data 570 (step S44).

When the selected conversion defining data has no conversion rate set, that is, when the selected data is setting data for the barter type (NO in step S40), the output element type 590 and the output element quantity 592 in the setting data are respectively copied and set to be the output element type 726 and the output element quantity 729 in the conversion control data 720 (step S46).

Next, the server system 1100 causes the user terminal 1500 to display the setting screen W4 (see FIG. 6), so that the manual selection of the input element starts to be received. Furthermore, the server system 1100 starts to display the preview of the type and the quantity of the output element at the current time point (step S48).

Specifically, a description based on the advertisement description data 558 (see FIG. 10) in the advertisement defining data 530 on the watching target advertisement is displayed in the to-be-watched advertisement description section 21 on the setting screen W4. The input element option presenting section 30 presents input element options based on pieces of the option presenting data 528 in the applied input element option list 722. The input element description section 31 displays a description based on the item defining data 520, the item description data 529, and the input element input quantity 724 corresponding to the input element type 723. The preview section 35 displays a preview based on the output element type 726 and the output element quantity 729 in the conversion control data 720.

Then, the process proceeds to FIG. 26. When the conversion skip operation icon 36 (see FIG. 6) is operated on the setting screen W4 (YES in step S60), the server system 1100 executes the advertisement output control without executing the item conversion (step S62), and the process is terminated.

As long as the conversion execution operation icon 37 is not operated (NO in step S64) on the setting screen W4, display updating in the input element description section 31, the updating of the type and the quantity of the output element, and the updating of the preview displayed in the preview section 35 are repeated.

When the conversion execution operation icon 37 is operated in the setting screen W4 (YES in step S64), the server system 1100 executes the advertisement output control (step S66). When the advertisement is completely output, that is, when the advertisement watching completion equivalent condition is satisfied, the control for consuming the input element, the control for giving the output element to the player, and control for issuing a notification indicating that the output element has been given, on the user terminal 1500 (step S68). Then, the process is terminated.

In the present embodiment described above, an item selected/set from items possessed by the player can be converted into a different item (output element) in return for watching the advertisement. Thus, the player can be more incentivized to watch the advertisement.

In the present embodiment, the user repeatedly watching the advertisement with the same content can acquire different output elements (corresponding to the reward for watching the advertisement) by selecting different input elements. Thus, the player can be more incentivized to watch the advertisement than in conventional cases. Thus, the user is less likely to be fed up with the advertisement and skip the advertisement displayed, as in the conventional cases.

The player recognizes the input element and the output element on the setting screen W4 and then watches an advertisement. Thus, the advertisement is watched with the user much more satisfied with give-and-take relationship, than in the case with conventional reward advertisement not enabling the player to know what is given until the reward is actually given. This point also contributes to further incentivizing the player to watch the advertisement Second Embodiment Next, a second embodiment of the present invention is described. The present embodiment is implemented in basically the same manner as that in the first embodiment, but is different from the first embodiment in that the player can manually select the advertisement to be watched. Components that are the same as the counterparts in the first embodiment are denoted with the same reference numerals, and the description thereof will be omitted. The difference from the first embodiment will be mainly described.

The system configuration according to the present embodiment is implemented in the same manner as that in the first embodiment.

The server system 1100 according to the present embodiment has the same functional configuration as that in the first embodiment. The advertisement watching setting section 233 according to the present embodiment can perform various watching settings including the selecting of an advertisement to be the target of the advertisement watching based on an operation input by the user.

Figure 27:
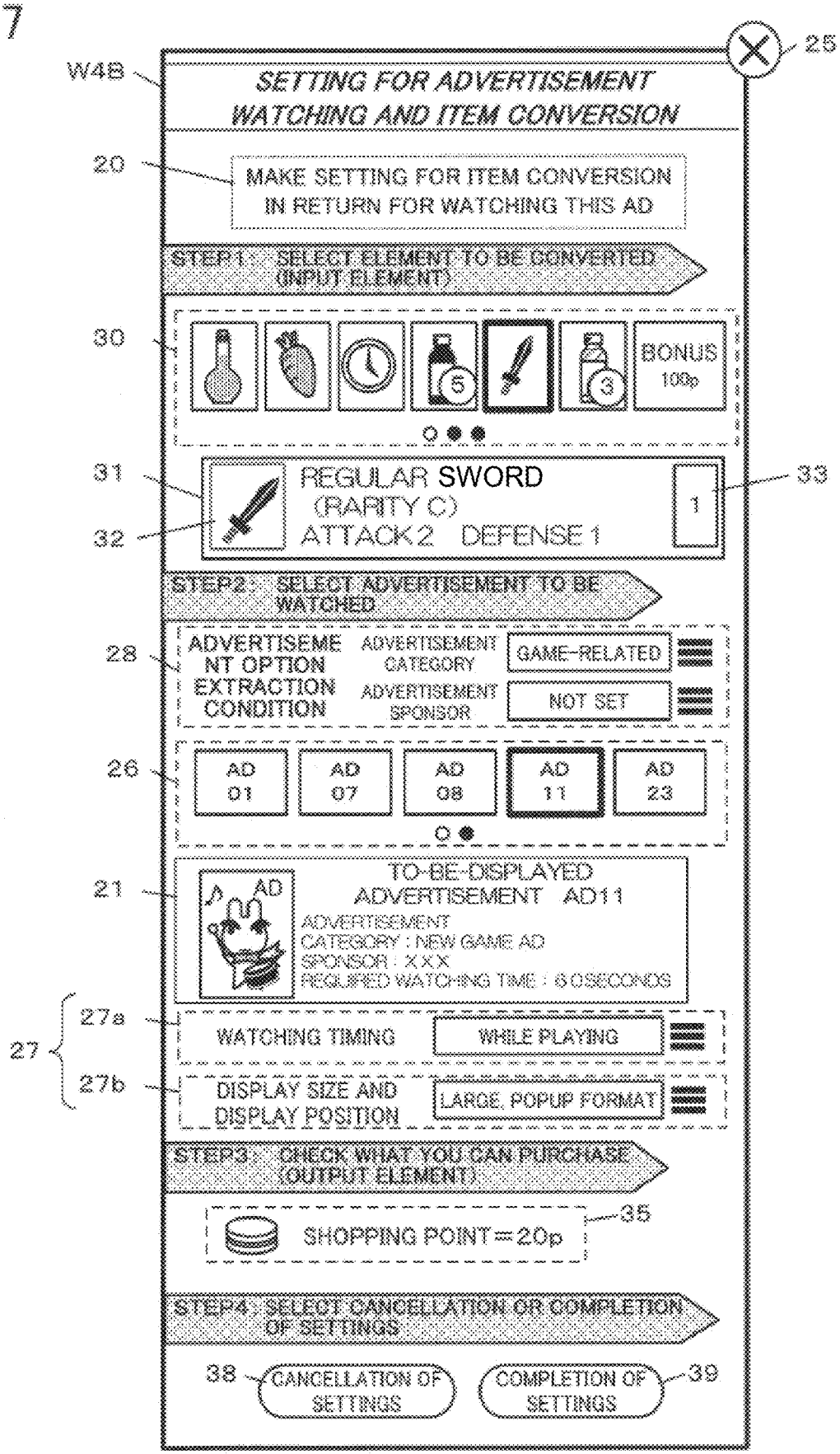
FIG. 27 is a diagram illustrating an example of a setting screen according to a second embodiment.

FIG. 27 is a diagram illustrating an example of a setting screen W4B according to the present embodiment. The setting screen W4B according to the present embodiment can be called from a menu displayed after the game has been started in the user terminal 1500 and a predetermined login procedure has been completed.

The setting screen W4B according to the present embodiment includes, an advertisement option extraction condition setting section 28, an advertisement option display section 26, and a watching environment setting section 27, which are display sections for setting the watching target advertisement and the watching environment thereof, added to the configuration of the setting screen W4 according to the first embodiment. The conversion skipping operation icon 36 and the conversion executing control icon 37 in the setting screen W4 according to the first embodiment is not included. Instead, a setting cancel operation icon 38 and a setting completion operation icon 39 are included.

The advertisement option extraction condition setting section 28 sets conditions for extracting an option presented on the advertisement option display section 26. In the present embodiment, two conditions on a category of an advertisement content and a sponsor of the advertisement can be set. Thus, the category of the advertisement content and/or the advertisement sponsor, in settings related to the advertisement watching control, are set by the advertisement option extraction condition setting section 28. Items that can be set by the advertisement option extraction condition setting section 28 may be limited to any one of these. Note that items other than these, such as the output mode (movie/still image/audio only), the required watching time, and for male/female, may be added as appropriate.

The advertisement option display section 26 presents selection operations of the watching target advertisement. In an example illustrated in FIG. 27, an icon of a representative scene of an advertisement option is provided for each option. Alternatively, a list format may be employed. When a predetermined selection operation (such as a touch operation on an icon) is performed on the advertisement option display section 26, a corresponding advertisement is set as the watching target advertisement. Then, a description on the advertisement is displayed on the to-be-watched advertisement description section 21.

In the watching environment setting section 27, environment settings (advertisement watching condition and format) are made. The content of the setting items can be set as appropriate. In the present embodiment, the section includes a timing setting section 27a and a size and position setting section 27b.

The timing setting section 27a enables designation of a timing for watching the advertisement. Settable options of such timings, which can be set as appropriate, include before gameplay (while the menu screen is being displayed, during online shopping, and during deck building), during gameplay, after gameplay, and not designated. Detailed options, such as while moving in the map, after a battle, and a change of scenes, may be set for the timing during the gameplay. Furthermore, options such as a date on which the watching target advertisement is output and a time zone or a day of a week in which the watching target advertisement is output may be included as appropriate.

The display size and position setting section 27b enables a combination of a type of the display size and a display mode to be selected. For example, large/medium/small, which are a plurality of sizes of the advertisement relative to the display size of the touch panel 1506 of the user terminal 1500, are prepared for the display size. Preferably, a popup format with an individual screen popup displayed on the game screen, a banner format with a strip shaped advertisement displayed at an edge of the screen, and the like are set for the display mode.

Setting items of the watching environment setting section 27 may be added or omitted as appropriate. For example, a setting for determining whether a single advertisement is displayed at a single timing or is divided to be displayed at a plurality of timings, or a setting for enabling/disabling a stop operation for stopping the watching partway may be included as appropriate.

Figure 28:
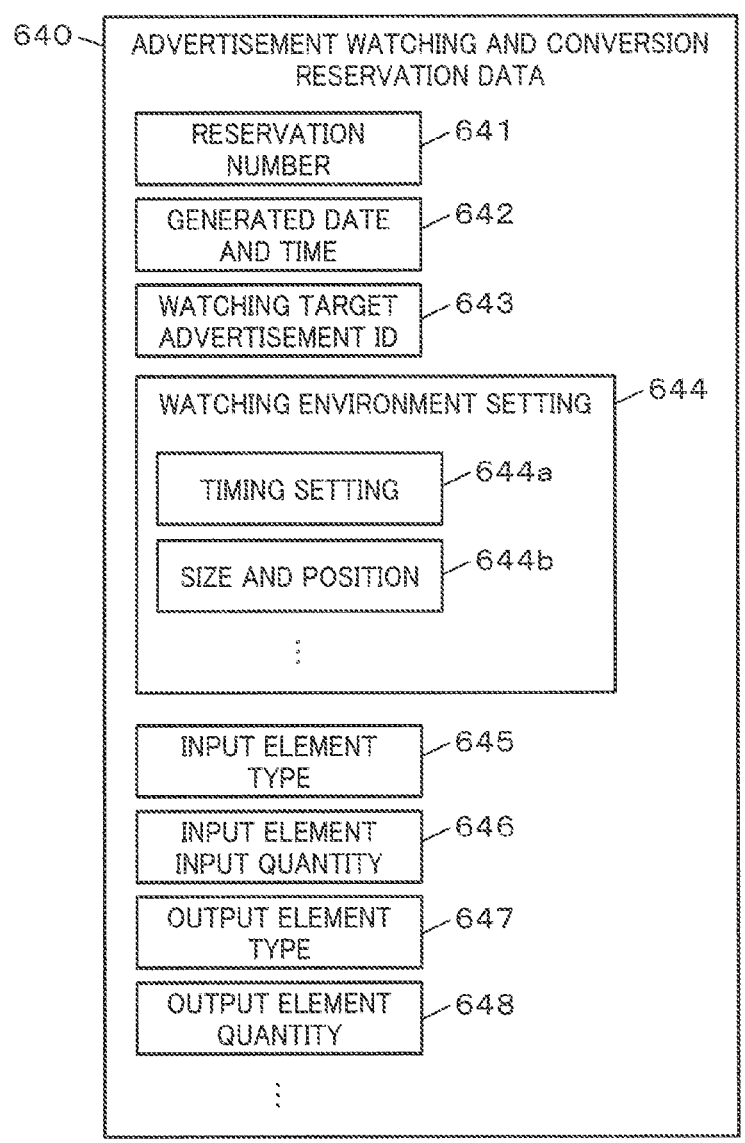
FIG. 28 is a diagram illustrating an example of a data structure of advertisement watching and conversion reservation data.

When the setting cancellation operation icon 38 is operated on the setting screen W4B according to the present embodiment, the item conversion setting is cancelled. When the setting completion operation icon 39 is operated, advertisement watching and conversion reservation data 640 as illustrated in FIG. 28 are generated in the user management data 600 on the player stored in the server storage section 500s.

The advertisement watching and conversion reservation data 640 includes a reservation number 641 that is automatically sequentially given in series, generated date and time 642 indicating the date and time at which the data has been generated, a watching target advertisement ID 643, watching environment setting 644, an input element type 645, an input element input quantity 646, an output element type 647, and an output element quantity 648.

The content of the watching environment setting 644 may be set depending on the design of an item settable by the player. In the present embodiment, the setting includes a timing setting 644a and a size and position arrangement setting 644b.

Figure 29:
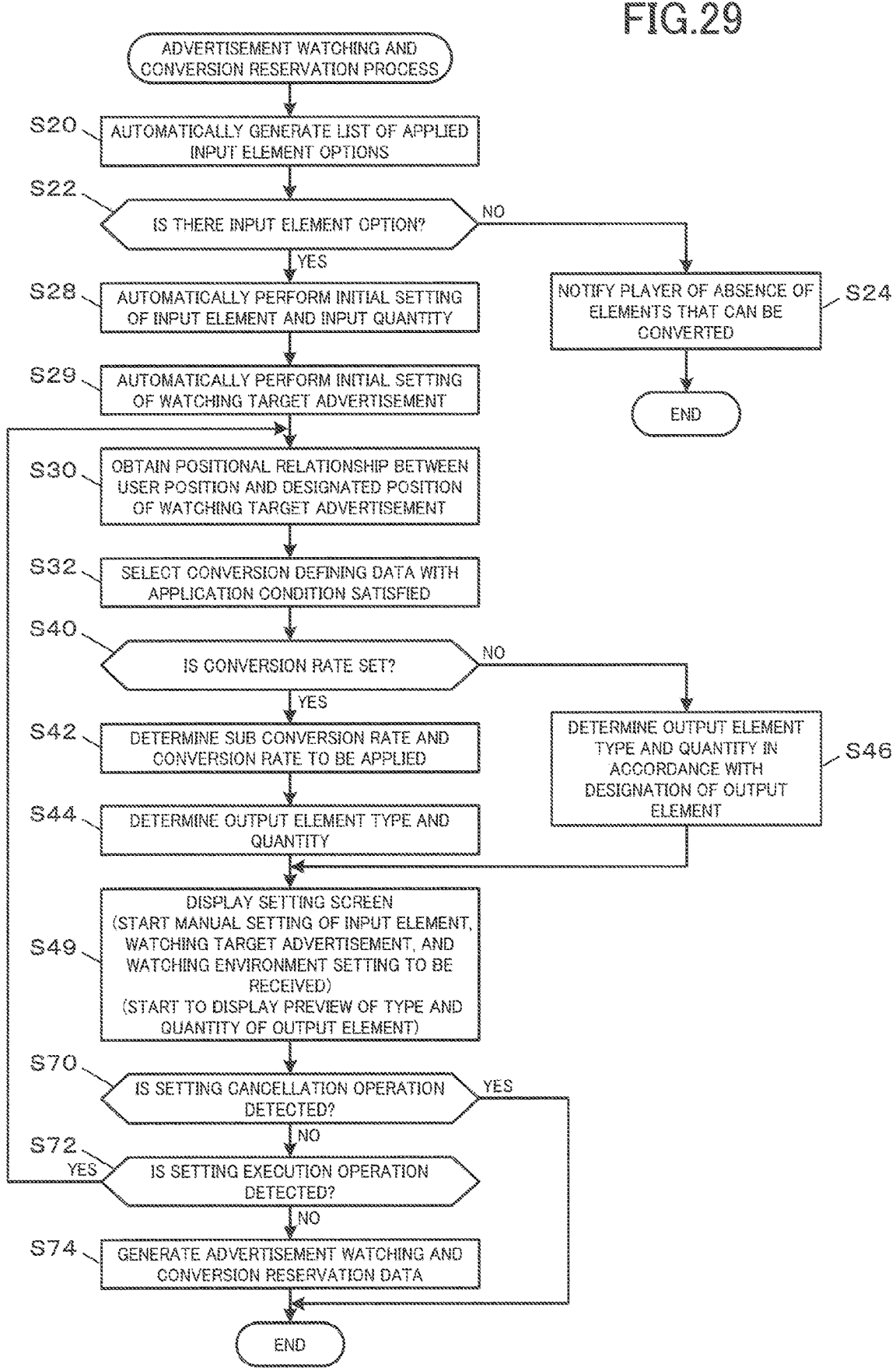
FIG. 29 is a flowchart illustrating a flow of a preview watching and conversion reservation process performed by a server system according to the second embodiment.

FIG. 29 is a flowchart illustrating a flow of advertisement watching and conversion reservation process performed by a server system 1100 according to the present embodiment. The process is performed by performing a predetermined calling operation. In the present embodiment, "advertisement watching and reservation" is provided in the menu item provided after the login, and can be operated for performing the calling operation.

A flow of the advertisement watching and reservation process is basically the same as that of the process in the first embodiment (see FIG. 25 and FIG. 26), except that the server system 1100 performs automatic initial setting for the watching target advertisement after step S28 (step S29). The advertisement may be set and selected based on a priority condition additionally prepared by a game administrator or may be randomly selected, from the advertisement defining data 530.

Here, step S48 in the first embodiment is omitted. Instead, the setting screen W4B is displayed, and manual selection of the input element, the watching target advertisement, and the watching environment setting (setting on the content of the advertisement watching control) starts to be received, and the preview of the type and the quantity of the output element starts to be displayed (step S49).

When the setting cancellation operation is input on the setting screen W4B (YES in step S70), the advertisement watching and conversion reservation process is terminated without generating the advertisement watching and conversion reservation data 640.

When the setting execution operation is input (YES in step S72), the server system 1100 newly generates the advertisement watching and conversion reservation data 640 (step S74), and the advertisement watching and conversion reservation process is terminated.

Figure 30:
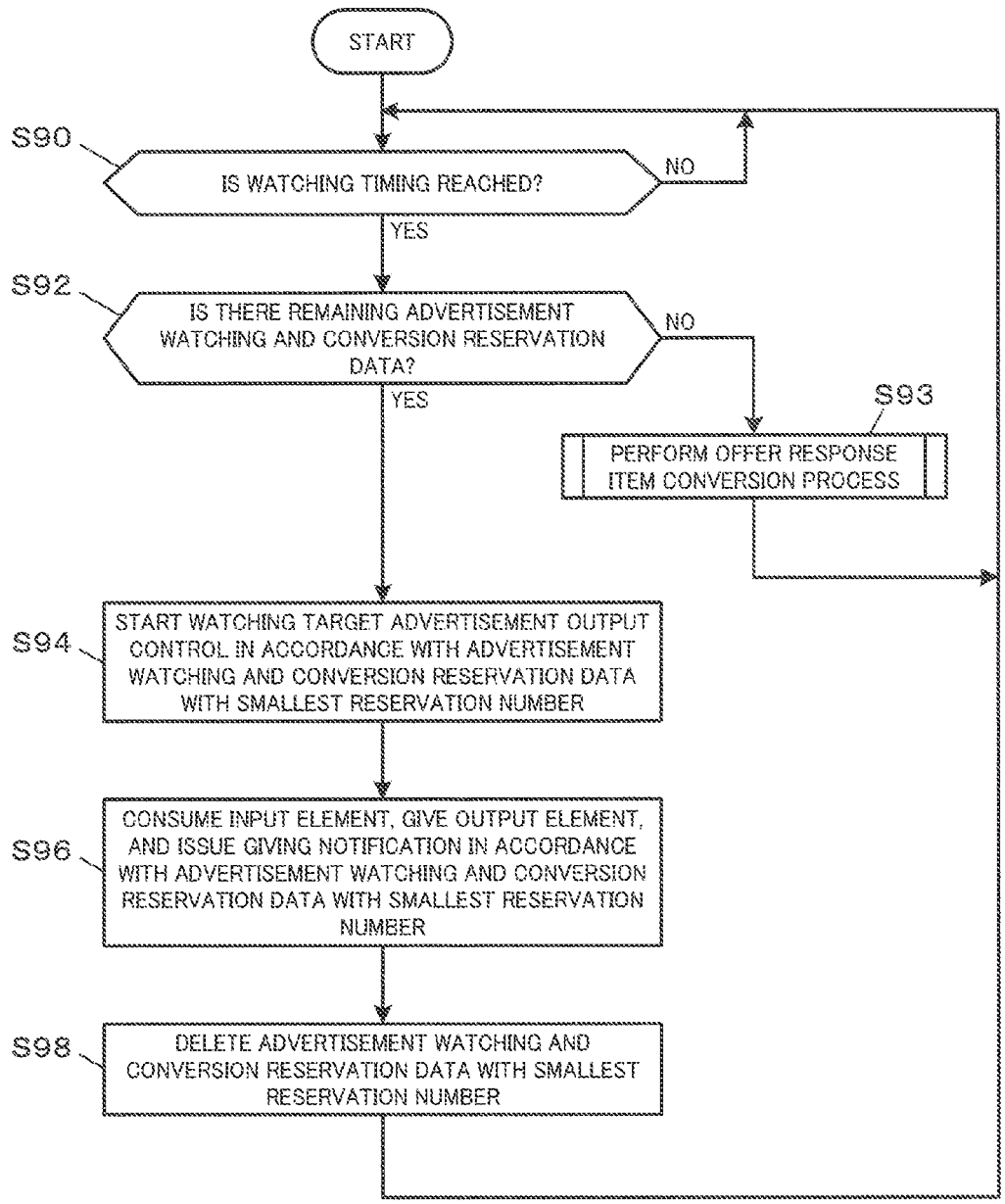
FIG. 30 is a flowchart illustrating a flow of a process related to an advertisement and item conversion according to a second embodiment, performed while a process other than the process preview watching and conversion reservation process is being performed.

FIG. 30 is a flowchart illustrating a flow of a process related to an advertisement and the item conversion performed by the server system 1100 according to the present embodiment, while a process other than the advertisement watching and conversion reservation process is being performed. The server system 1100 according to the present embodiment periodically determines the watching timing. When the watching timing is reached (YES in step S90) with the advertisement watching and conversion reservation data 640 remaining (YES in step S92), the watching target advertisement output control is started in accordance with the advertisement watching and conversion reservation data 640 with the smallest reservation number 641 (step S94). When the output of the advertisement is completed, that is, when the watching completion equivalent condition is satisfied, the output element is given with the input element consumed and a giving notification is issued in accordance with the advertisement watching and conversion reservation data 640 (step S96). Then, the advertisement watching and conversion reservation data 640 is deleted (step S98).

When the advertisement watching timing arrives with no remaining advertisement watching and conversion reservation data 640 (NO in step S92), the server system 1100 according to the present embodiment performs the offer response item conversion process (see FIGS. 25 and 26).

The present embodiment described above can achieve the same effects as the first embodiment, and enables the player to set the advertisement to be watched, a timing of displaying the advertisement, how the advertisement is displayed, and the item conversion in advance.

Third Embodiment

Next, a third embodiment of the present invention is described. The present embodiment is basically implemented in a manner similar to that in the first embodiment, but has a distinct feature that the advertisement output control is automatically performed. In the first embodiment, the player is requested to confirm the advertisement watching and set the item conversion before the advertisement starts to be output, and the advertisement output control is performed in accordance with the response from the player. In the present embodiment, the advertisements are automatically displayed one after another without the player's confirmation. The, the input element and the like are set while the advertisement is being displayed, to be converted into the output element to be given when the advertisement watching is terminated. Components that are the same as the counterparts in the first embodiment are denoted with the same reference numerals, and the description thereof will be omitted. The difference from the first embodiment will be mainly described.

The configuration of a game system according to the present embodiment is the same as that in the first embodiment.

The functional configuration according to the present embodiment is also the same as that in the first embodiment.

Figure 31:
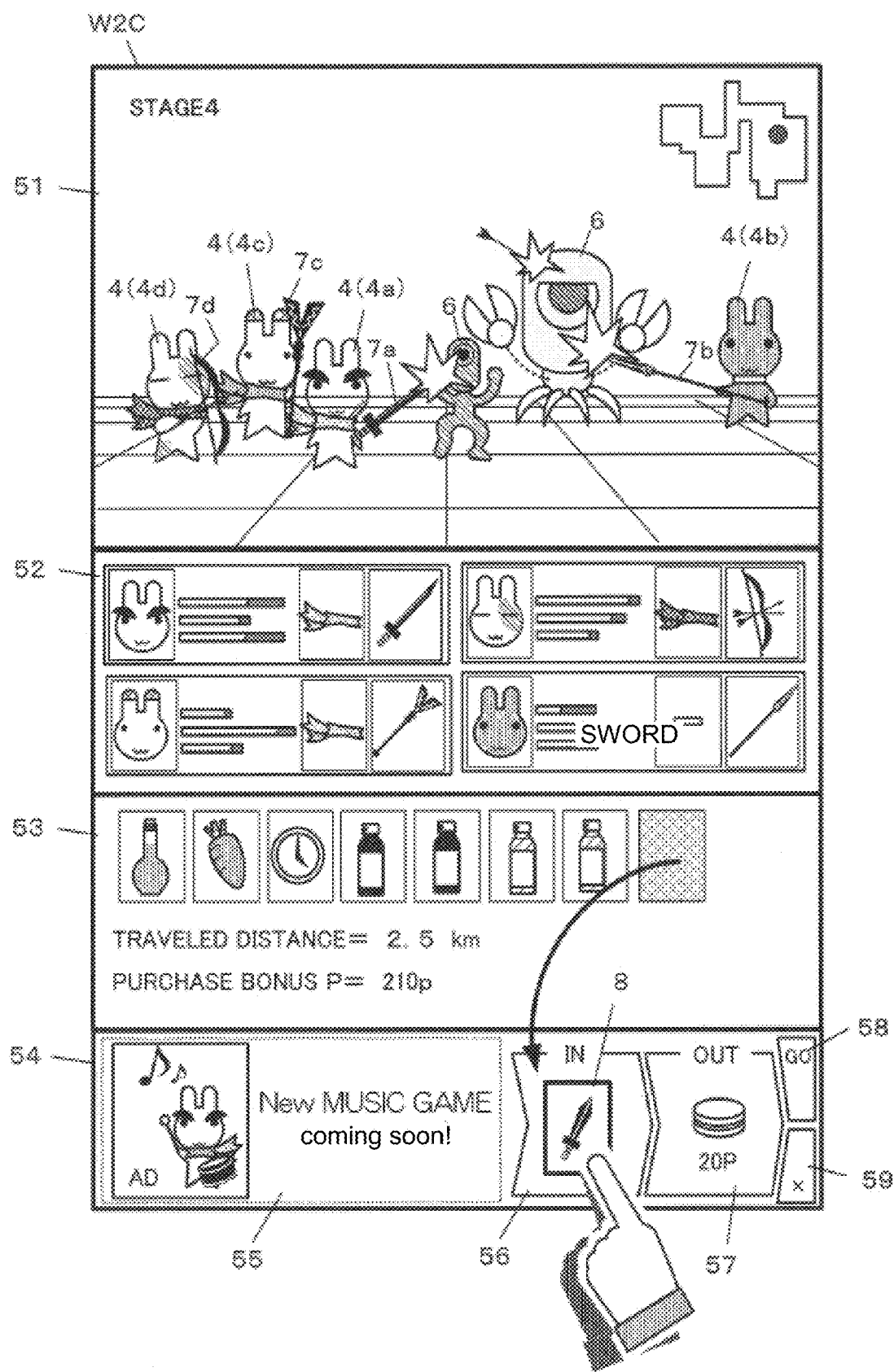
FIG. 31 is a diagram illustrating an example of a game screen displayed on a user terminal during gameplay according to a third embodiment.

FIG. 31 is a diagram illustrating an example of a game screen displayed on the user terminal 1500 during gameplay according to the present embodiment. The game screen W2C according to the present embodiment includes a main display section 51 illustrating the player characters 4 (4a, 4b, . . . ), a status display section 52 displaying the equipment and parameter values of the player characters 4 (4a, 4b, . . . ), a possessed item display section 53 displaying an entertainment elements/disposable information possessed by the player, and an advertisement display section 54.

The advertisement display section 54 includes an advertisement display area 55 in which advertisements are switched from one to another to be sequentially displayed automatically, an input element setting area 56 for setting an item to be the input element, an output element preview area 57 displaying a preview of the output element, a conversion execution operation icon 58, and a conversion skip operation icon 59.

When a predetermined setting operation (for example, a drag-and-drop operation) is performed to move the icon 8 corresponding to one item displayed on the possessed item display section 53 to the input element setting area 56, the entertainment elements/disposable information corresponding to the icon is set to be the input element. When the setting operation is repeatedly performed on the same icon 8, the input quantity of the input element increases. When the setting operation is performed on a different icon 8, the input element setting is updated.

Thus, when the input element is set, the type and the quantity of the output element is set as in the first embodiment, and a preview of the output element is displayed on the output element preview area 57.

When the player is satisfied with the content of the conversion and operates the conversion execution operation icon 58, the item conversion is executed. Thus, the input element is consumed, and the output element is given.

When the player is unsatisfied with the content of the conversion and thus operates the conversion skip operation icon 59, the item conversion is cancelled.

Figure 32:
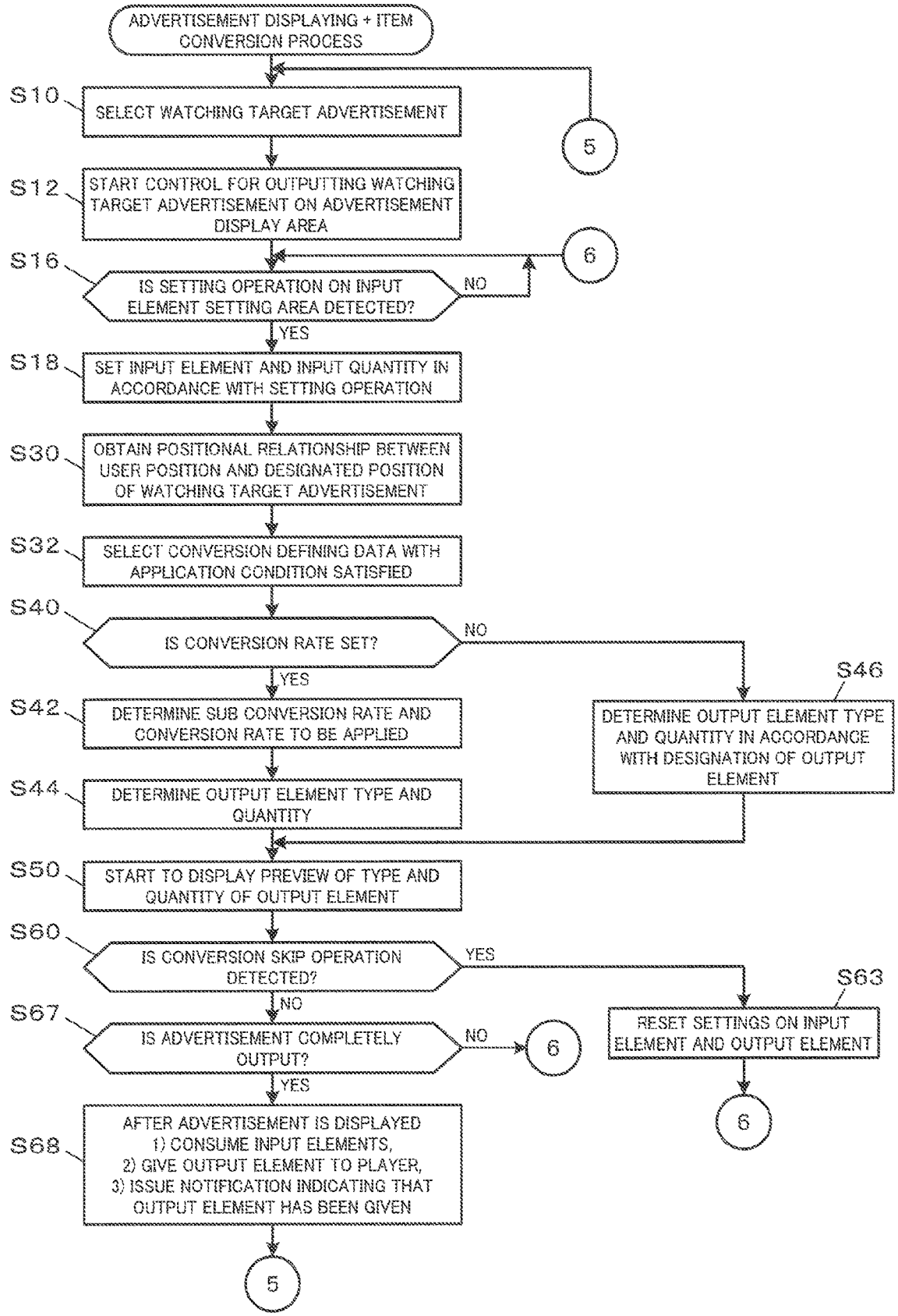
FIG. 32 is a flowchart illustrating a flow of a process related to advertisement output and item conversion performed by a server system according to the third embodiment.

FIG. 32 is a flowchart illustrating a flow of a process related to advertisement output and item conversion performed by the server system 1100 according to the present embodiment. A flow of process described herein is referred to as "advertisement displaying+item conversion process".

The server system 1100 selects a watching target (step S10). The result of the selection is set to the watching target advertisement ID 721 in the conversion control data 720 (see FIG. 23).

The server system 1100 starts control for outputting the watching target advertisement on the advertisement display area 55 (step S12). The processes in steps S16 to S67 are repeated until the advertisement output is completed. When the advertisement output is completed, the process in step S68 is performed. Then, the server system 1100 selects the next watching target advertisement and starts the output control for the advertisement (steps S10 and S12), and these processes are repeated.

Until one advertisement output is completed, when the setting operation on the input element setting area 56 is detected (YES in step S16), the server system 1100 sets the input element type 723 and the input element input quantity 724 (step S18), and obtains the positional relationship 725 (step S30). Then, the output element type 726 and the output element quantity 729 (see FIG. 23) are determined (steps S32 to S46), and a preview starts to be displayed on the output element preview area 57 (step S50).

When the advertisement is completely output, that is, when the advertisement watching completion equivalent condition is satisfied (YES in step S67), the input element is consumed, the output element is given to the player, and the element giving notification is issued. Then, the process returns to step S10.

The present embodiment can provide the same advantageous effect as the first embodiment.

Fourth Embodiment

Next, a fourth embodiment of the present invention is described.

The present embodiment is implemented to be basically the same with any one of the first to the third embodiments, but is different from the first to the third embodiments in that the user terminal 1500 performs the game management and advertisement management process. The following description is mainly based on the first embodiment. Components that are the same as the counterparts in the first to the third embodiments are denoted with the same reference numerals, and the description thereof will be omitted. The difference from the first embodiment will be mainly described.

Figure 33:
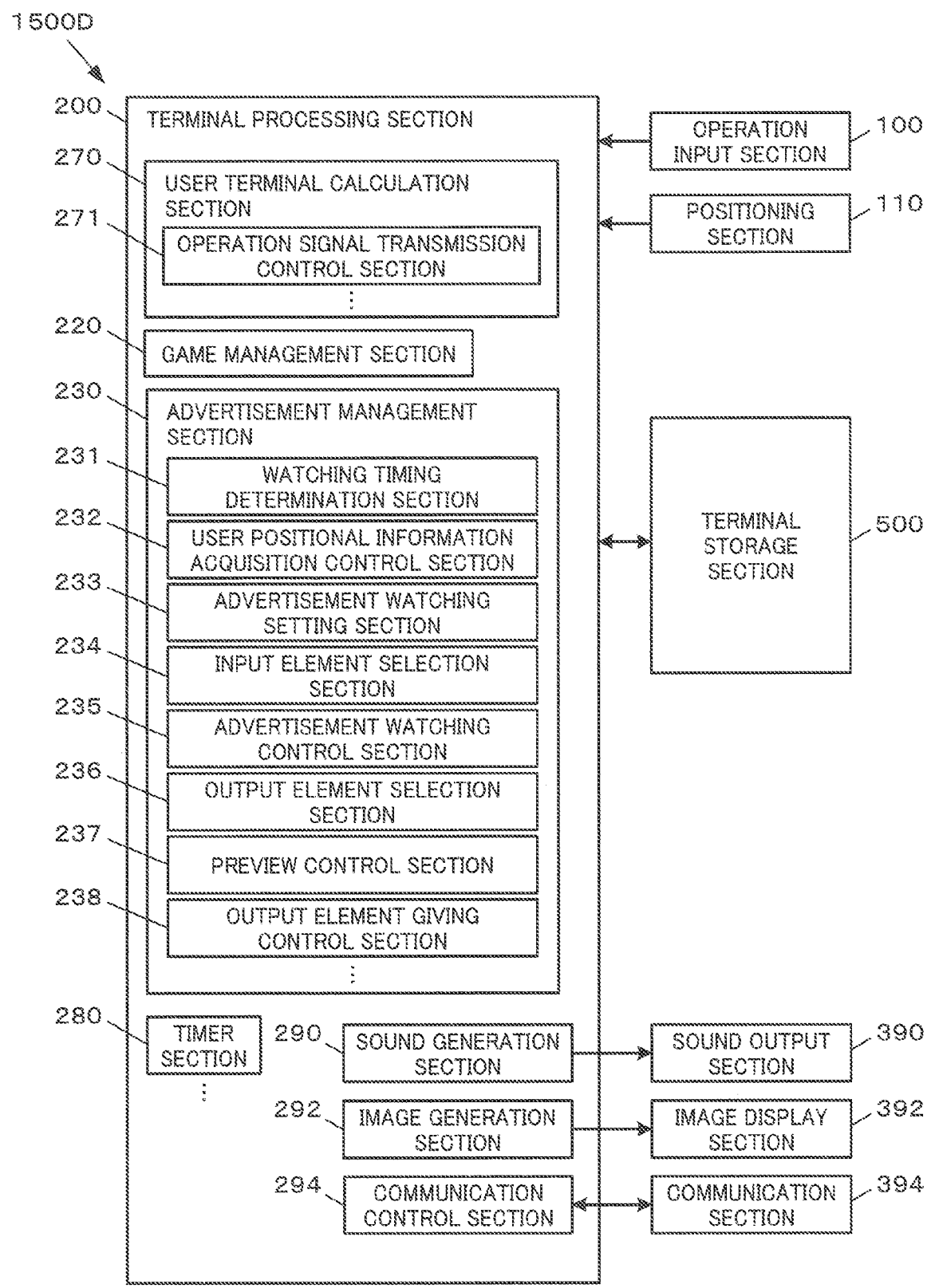
FIG. 33 is a functional block diagram illustrating an example of a functional configuration of a user terminal according to a fourth embodiment.

FIG. 33 is a functional block diagram illustrating an example of a functional configuration of a user terminal 1500D according to the present embodiment. The user terminal 1500D according to the present embodiment is a computer system in which the game screen display control section 272, the sound play control section 273, and the user positional information provision control section 274 are omitted and the game management section 220 and the advertisement management section 230 are provided instead. Specifically, the user terminal 1500D according to the present embodiment does not acquire data for displaying a game screen image or data for playing sounds from the server system 1100, but performs a calculation process related to the game management to perform the game progress control, and thus generates images of the game screen and an advertisement and controls the sound play therefor. The user terminal 1500D determines a timing to output an advertisement and also sets and executes the item conversion.

Figure 34:
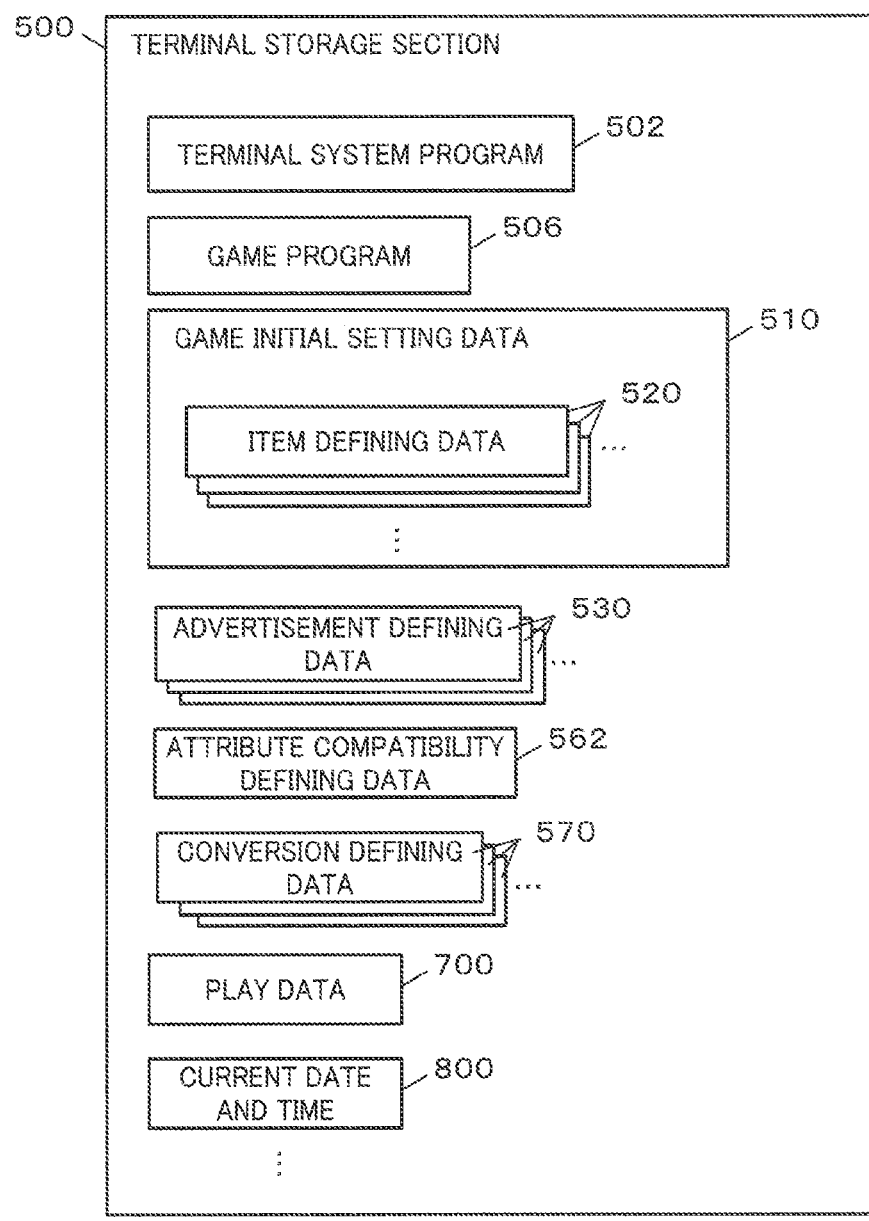
FIG. 34 is a diagram illustrating an example of a program and data stored in a terminal storage section of a user terminal according to the fourth embodiment.

FIG. 34 is a diagram illustrating an example of a program and data stored in the terminal storage section 500 of the user terminal 1500D according to the present embodiment.

The terminal storage section 500 according to the present embodiment stores therein the terminal system program 502 and the game program 506. Thus, as the user terminal 1500D processes the game management section 220 and the advertisement management section 230, the game initial setting data 510, the advertisement defining data 530, the attribute compatibility defining data 562, the conversion defining data 570, and the play data 700 are stored in the terminal storage section 500.

The game program 506 is a program that causes the terminal processing section 200 to implement the user terminal calculation section 270, and the game management section 220, and the advertisement management section 230 according to the present embodiment.

Since the present embodiment is based on the first embodiment, the flow of the process according to the present embodiment is basically the same as the flow of the process (see FIG. 25 and FIG. 26) performed by the server system 1100 according to the first embodiment. The user terminal 1500D implements the game management section 220 and the advertisement management section 230, and thus the subject of each step may be changed to the user terminal 1500D as appropriate.

To implement the present embodiment based on the second embodiment, the flow of the process according to the present embodiment is basically the same as the flow of the process (see FIG. 29) performed by the server system 1100 according to the second embodiment. The user terminal 1500D implements the game management section 220 and the advertisement management section 230, and thus the subject of each step may be changed to the user terminal 1500D as appropriate. As a matter of course, to implement the present embodiment based on the third embodiment, the flow of the process according to the present embodiment is basically the same as the flow of the process (see FIG. 32) performed by the server system 1100 according to the third embodiment.

No matter which of the first to the third embodiments the present embodiment is based on, when the user terminal 1500D performs a process requiring the user management data 600 to be referred to/changed, the server system 1100 is requested to provide required data, perform matching, or the like or may be requested to perform the entire process as appropriate.

The present embodiment can provide the same advantageous effect as the embodiment among the first to the third embodiments on which the present embodiment is based. The user terminal 1500D may be partially in charge of the functions of the game management section 220 and the advertisement management section 230, instead of being entirely in charge of the functions.

MODIFICATIONS

The embodiments to which the invention is applied have been described above. Note that the invention is not limited thereto. Various modifications may be made as appropriate, such as adding other elements, omitting some of the elements, or changing some of the elements.

First Modification

For example, in the example according to the first embodiment, the entire game system is implemented with a client-server system. However, this should not be construed in a limiting sense. For example, a computer system in which a plurality of user terminals 1500 can establish a peer-to-peer (P2P) connection may be implemented for a battle game. Specifically, the server system 1100 provides data as a matching result to the user terminals 1500 matched by the server system 1100, and then the user terminals establish the P2P connection. One of the user terminals 1500 is in charge of the functions of the game management section 220 and the advertisement management section 230. Alternatively, a plurality of user terminals 1500 may cooperate to implement the functions.

Second Modification

The system according to the examples described in the embodiments described above includes the server system 1100 and the plurality of user terminals 1500. Alternatively, the present invention may be similarly applied to a game system including a single computer. For example, the present invention may be applied to a single game device. Thus, for implementing advertisement output, a single advertisement output control device may be employed.

Figure 35:
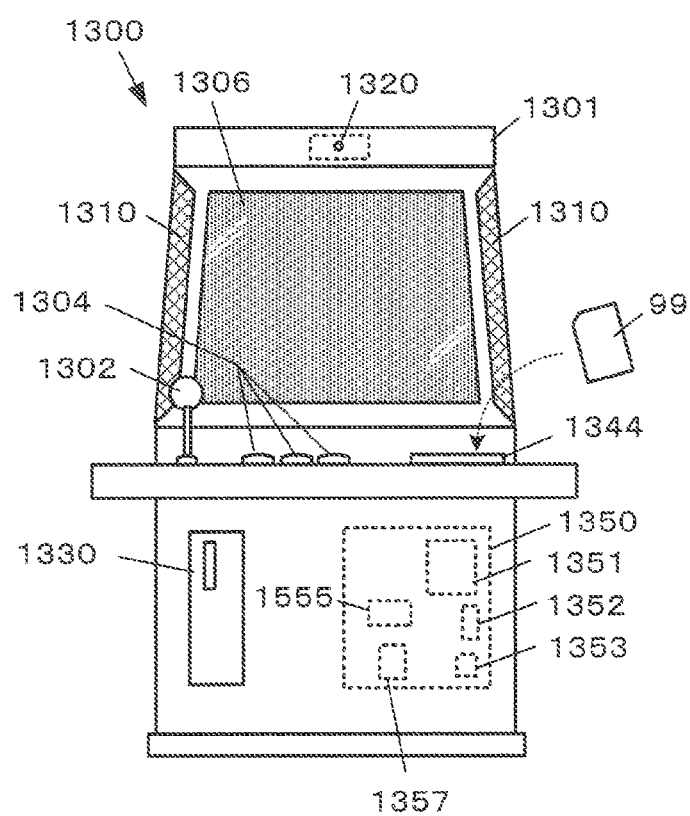
FIG. 35 is an external front view illustrating an example of a configuration of an arcade game device employing the present invention.

Specifically, FIG. 35 is an outer front view illustrating an example of a configuration of an arcade game device 1300 employing the present invention. The arcade game device 1300 includes a casing main body 1301 provided with operation input units, used by the player to input operations, including: a joystick 1302; a button switch 1304; and a touch panel 1306 that functions as an image display device and as a touch position input device. The casing main body 1301 is further provided with a speaker 1310, a player image capturing camera 1320, a payment device 1330, a medium reading device 1344 for writing and reading data to and from an electronic payment medium 99, and a control board 1350.

The control board 1350 includes various processors (e.g., a CPU 1351, a GPU, and a DSP), various IC memories 1352 (e.g., a VRAM, a RAM, and a ROM), a communication device module 1353 for establishing communication connection with the communication line 9, a position measurement module 1355, an I/F controller 1357 (interface controller), and the like.

For example, the I/F controller 1357 includes 1) a driver circuit for the touch panel 1306, 2) a circuit that receives a signal from the joystick 1302 and the button switch 1304, 3) an output amplifier circuit that outputs a sound signal to the speaker 1310, 4) a circuit that reads image data on an image captured by the player image capturing camera 1320, 5) a circuit for outputting and receiving a signal to and from the payment device 1330 and the medium reading device 1344, 6) a circuit for receiving a signal from the position measurement module 1355, and the like.

These elements of the control board 1350 are electrically connected to each other via a bus circuit, to be capable of reading and writing data and exchanging signals. The control board 1350 may be partially or entirely implemented with an ASIC, an FPGA, or a SoC.

The control board 1350 executes the game program to perform the calculation process, and controls each section of the arcade game device 1300 to enable the gameplay in accordance with an operation input with the joystick 1302, the button switch 1304, and the touch panel 1306. The arcade game device 1300 has a required program and various types of setting data in the IC memory 1352 in advance. Alternatively, the program and the data may be downloaded from an external device each time the system is booted.

The control board 1350 performs control so that the arcade game device 1300 sequentially transmits the result of the operation input using the joystick 1302, the touch panel 1306, or the like to the server system 1100 and receives the various types of data for playing the game from the server system 1100. Image of the game screen is generated and displayed on the touch panel 1306, and the sound signal corresponding to the sound effects and an operation sound is generated and emitted from the speaker 1310. Thus, the player can enjoy the gameplay as well as watching an advertisement, by operating the joystick 1302 or the like while watching the game screen displayed on the touch panel 1306 and listening to the game sound from the speaker 1310.

In this configuration, the functions of the server system 1100 and the user terminal 1500 according to the first embodiment are implemented with the arcade game device 1300 alone.

Note that the advertisement defining data 530, the conversion defining data 570, the user management data 600, and the like may be stored in the server system 1100 as in the first embodiment, and data may be acquired and updated with the arcade game device 1300 issuing a request to the server system 1100 each time the acquisition or the updating is required.

Third Modification

The output element quantity 729 (see FIG. 23), which is fixed after being determined in the embodiment described above, may be variable in accordance with an actual watching status of the watching target advertisement.

Figure 36:
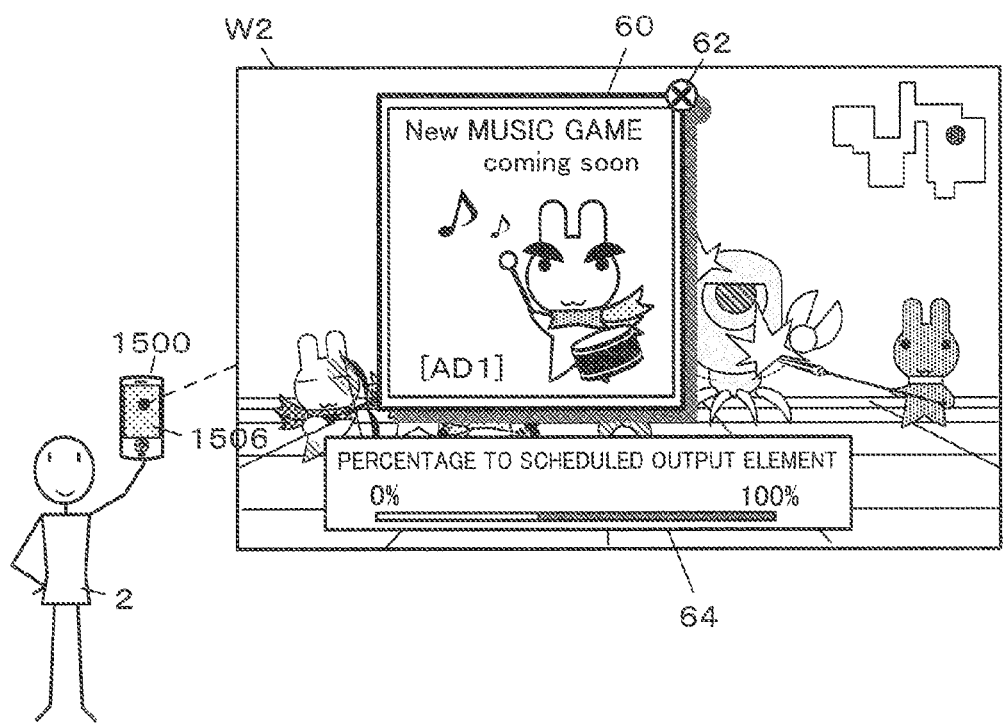
FIG. 36 is a diagram illustrating an example of a game screen according to a modification.

Specifically, the watching of the advertisement being displayed can be stopped by the player at any desired timing. For example, as illustrated in FIG. 36, the advertisement 60 is displayed on the game screen W2, sound is output, and a watching stop operation icon 62 is displayed on the user terminal 1500. Furthermore, a meter 64 indicating a ratio of the currently watched time is displayed with the required watching time set to be 100%. In the control for giving the output element, the quantity, as a result of multiplying the output element quantity 729 (see FIG. 23) by the rate indicated by the meter, may be given to the player. When the output element is a point, the point may be simply reduced. When the output element is an article such a weapon, the quality (for example, the level of the weapon) of the element may be degraded based on the rate displayed on the meter.

Fourth Modification

In the above embodiment, an example where the item conversion is performed based on the advertisement watching related to the game is performed. Note that the item conversion may be performed based on an advertisement on a display screen for user operation in a website providing various services to registered users. In such a configuration, the input element is preferably set to be a membership point usable as a service fee, a coupon such as a rental coupon, an even participation ticket, a free lottery ticket, or the like that is determined in accordance with how frequently the user uses the website.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer system comprising: at least one processor or circuit programmed to:
   control progress of a game;
   manage, during progress of the game, user management data of a user of the game, the user management data including data on possessed items possessed by the user;
   provide an input element option presenting menu that displays a plurality of different input elements to be converted by watching an advertisement, wherein each input element of the different input elements is from an entertainment element, possessed by the user, related to the game, wherein the plurality of different input elements is based on possessed items currently possessed by the user as indicated in the user management data for the user;
   receive a user input operation from the user that selects an input element among the displayed input elements;
   perform watching control for a watching target advertisement and perform conversion of the selected input element into an output element that is the entertainment element different from the input element in return for watching an advertisement among a plurality of advertisements, wherein the conversion follows pre-defined conversion defining data, the pre-defined conversion defining data being pre-defined as associated with the advertisement, the pre-defined conversion defining data defining (a) a type of the input element, (b) a quantity of the input element, (c) a date/time of watching the advertisement, (d) a quantity of the output element, and (e) a type of the output element, wherein one or more of (a) to (e) can be different for different advertisements; and
   give the output element to the user when watching of the watching target advertisement satisfies a completion equivalent condition.

2. The computer system as defined in claim 1 further comprising selecting the watching target advertisement based on an operation input by the user.

3. The computer system as defined in claim 2, the selecting the watching target advertisement including selecting a category and/or a sponsor related to an advertisement content based on the operation input by the user to select the watching target advertisement.

4. The computer system as defined in claim 1 further comprising selecting the output element based on the watching target advertisement.

5. The computer system as defined in claim 1 further comprising performing watching setting for the watching target advertisement.

6. The computer system as defined in claim 5 further comprising selecting the output element based on the watching setting.

7. The computer system as defined in claim 6, the watching setting including time setting related to time at which the watching target advertisement is output,
   the selecting the output element including selecting the output element based on the time setting.

8. The computer system as defined in claim 6, the watching setting including timing setting including at least one of a timing in the game at which the watching target advertisement is output, date and time at which the watching target advertisement is output, and a time zone in which the watching target advertisement is output,
   the selecting the output element including selecting the output element based on the timing setting.

9. The computer system as defined in claim 6, the watching setting including setting related to an output mode of the watching target advertisement,
the selecting the output element including selecting the output element based on the output mode.

10. The computer system as defined in claim 1, the selecting the input element including selecting the input element based on the user input operation input by the user,
the computer system further comprising selecting the output element at least based on the input element.

11. The computer system as defined in claim 10, the selecting the output element including selecting the output element based on a quantity of the entertainment element possessed by the user that is same as the input element and/or a quantity of the entertainment elements selected as the input element.

12. The computer system as defined in claim 10, wherein the at least one processor or circuit is further programmed to
determine a compatibility between the input element and the watching target advertisement which is predetermined based on a type of the input element relative to an attribute of the advertisement;
wherein the selecting the output element including selecting the output element based on the compatibility determined between the input element and the watching target advertisement.

13. The computer system as defined in claim 1, the watching target advertisement being associated with information indicating a designated position,
the computer system further comprising: acquiring positional information indicating a position of the user; and
selecting the output element based on positional relationship between the position indicated by the positional information and the designated position.

14. The computer system as defined in claim 1, the entertainment element being associated with a valid period during which the entertainment element is selectable as the input element,
the selecting the input element including selecting the input element from entertainment elements the valid period of which has not been expired yet.

15. The computer system as defined in claim 1, further comprising displaying a preview of the output element given when the completion equivalent condition is satisfied, before the watching of the watching target advertisement satisfies the completion equivalent condition.

16. A computer system comprising: at least one processor or circuit programmed to:
manage, during progress of a game, user management data of a user of the game, the user management data including data on possessed items possessed by the user;
provide an input element option presenting menu that displays a plurality of different input elements to be converted by watching an advertisement, wherein each input element of the different input elements is from a plurality of pieces of disposable information, possessed by the user, related to the game, wherein the plurality of different input elements is based on possessed items currently possessed by the user as indicated in the user management data for the user;
receive a user input operation from the user that selects an input element among the displayed input elements;
perform watching control for displaying, on a display screen for user operations, an advertisement and perform conversion of the selected input element into an output element that is the disposable information different from the input element in return for watching the advertisement among a plurality of advertisements, wherein the conversion follows pre-defined conversion defining data, the pre-defined conversion defining data being pre-defined as associated with the advertisement, the pre-defined conversion defining data defining (a) a type of the input element, (b) a quantity of the input element, (c) a date/time of watching the advertisement, (d) a quantity of the output element, and (e) a type of the output element, wherein one or more of (a) to (e) can be different for different advertisements; and
give the output element to the user when watching of the advertisement satisfies a completion equivalent condition.

17. An advertisement output control system comprising: a server system that is the computer system as defined in claim 1; and
a user terminal to which the user inputs an operation,
the server system and the user terminal being connected to the advertisement output control system to be capable of performing a communication with each other.

18. An advertisement output control system comprising: a server system that is the computer system as defined in claim 16; and
a user terminal to which the user inputs an operation,
the server system and the user terminal being connected to the advertisement output control system to be capable of performing a communication with each other.

19. An advertisement output control device comprising an operation input section to which the user inputs an operation, the advertisement output control device being the computer system as defined in claim 1.

20. An advertisement output control device comprising an operation input section to which the user inputs an operation, the advertisement output control device being the computer system as defined in claim 16.

21. The computer system of claim 1, wherein the processor or circuit is further programmed to
acquire a latest user positional information as a physical location of the user of the game,
further determine a type and quantity of the output element based on whether the physical location of the user of the game is within a predetermined location information range previously designated by the pre-defined conversion defining data for the watching target advertisement.

22. The computer system of claim 1, further comprising a conversion valid period associated with each input element of the plurality of different input elements, wherein the conversion valid period indicates a pre-defined period in which the each input element is convertible by the conversion that is performed, wherein the displayed plurality of different input elements to be converted are limited to those with an unexpired conversion valid period.

* * * * *